(12) United States Patent
Turner et al.

(10) Patent No.: US 8,762,964 B2
(45) Date of Patent: Jun. 24, 2014

(54) OPTIMIZING SYMBOL MANIPULATION LANGUAGE-BASED EXECUTABLE APPLICATIONS FOR DISTRIBUTED EXECUTION

(75) Inventors: Bryan Turner, Durham, NC (US); Billy Gayle Moon, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 518 days.

(21) Appl. No.: 12/972,069

(22) Filed: Dec. 17, 2010

(65) Prior Publication Data
US 2012/0159459 A1    Jun. 21, 2012

(51) Int. Cl.
*G06F 9/44*      (2006.01)
*G06F 17/30*     (2006.01)

(52) U.S. Cl.
USPC ........... 717/138; 717/135; 717/136; 717/137; 707/713

(58) Field of Classification Search
CPC .................................... G06F 8/30; G06F 8/45
See application file for complete search history.

(56) References Cited

U.S. PATENT DOCUMENTS

| | | | |
|---|---|---|---|
| 5,734,907 A * | 3/1998 | Jarossay et al. | 717/141 |
| 5,790,789 A * | 8/1998 | Suarez | 709/202 |
| 5,860,010 A * | 1/1999 | Attal | 717/137 |
| 6,446,109 B2 * | 9/2002 | Gupta | 709/203 |
| 7,082,465 B1 * | 7/2006 | Martin et al. | 709/224 |
| 7,594,221 B2 * | 9/2009 | Bhushan et al. | 717/136 |
| 8,087,007 B2 * | 12/2011 | Duneau | 717/135 |
| 8,245,202 B2 * | 8/2012 | Miura | 717/138 |
| 8,380,700 B2 * | 2/2013 | Moon et al. | 707/713 |
| 8,612,279 B2 * | 12/2013 | Moon et al. | 705/7.26 |
| 2010/0145979 A1 * | 6/2010 | Barnett | 707/769 |
| 2012/0159459 A1 * | 6/2012 | Turner et al. | 717/138 |

OTHER PUBLICATIONS

"Functional programming", [Online], Publisher: Wikipedia, pp. 1-14, [Retrieved from Internet on Sep. 18, 2013], <http://en.wikipedia.org/wiki/Functional_programming>.*

"XQuery: An XML query language", by D. Chamberlin, [Online], Jun. 2002, pp. 597-615, [Retrieved from Internet on Sep. 18, 2013], <http://ieeexplore.ieee.org/stamp/stamp.jsp?tp=&arnumber=5386883>.*

"Turing completeness",Publisher: Wikipedia, [Online], [Retrieved from Internet on Sep. 18, 2013],<http://en.wikipedia.org/wiki/Turing_completeness>.*

(Continued)

*Primary Examiner* — Thuy Dao
*Assistant Examiner* — Ziaul A Chowdhury
(74) *Attorney, Agent, or Firm* — Leon R. Turkevich

(57) ABSTRACT

In one embodiment, a method comprises receiving an application that describes functions according to a prescribed symbol manipulation language, the prescribed symbol manipulation language a non-Turing complete language that does not permit partial functions and describes the functions independent of any attribute of any computing system; identifying, in the application, a distribution annotation that identifies a candidate element in the application, the candidate element configured for execution in a distributed computing operation by a distributed computing system comprising two or more distributed computing devices; generating one or more variants of the application based on executing a nondestructive transformation of the application relative to prescribed equality axioms, at least one of the variants containing a corresponding semantically-equivalent variation of the candidate element; and selecting one of the variants as an optimization for execution of the application by the distributed computing system relative to prescribed metrics.

15 Claims, 14 Drawing Sheets

(56) References Cited

OTHER PUBLICATIONS

"A Verified Compiler for an Impure Functional Language", By-Adam Chlipala, [Online], Jan. 2010, pp. 1-14, [Retrieved from Internet on Sep. 20, 2013], <http://adam.chlipala.net/papers/ImpurePOPL10/ImpurePOPL10.pdf>.*

Allen Newell et al., Computer Science as Empirical Inquiry: Symbols and Search', [Online], ACM 1975, pp. 113-126, [Retrieved from Internet on Feb. 2, 2014], <http://www.cs.utexas.ed/~kuipers/readings/Newell+Simon-cacm-76.pdf>.*

Roy A Sorensen, "Mirror Notation Symbol Mnipulation Without Inscription Manipulation", [Online], 1999. pp. 141-164, [Retrieved from Internet on Feb. 2, 2014], <http://pages.wustl.edu/files/pages/imce/sorensen/mirror_notation-_symbol_manipulation.pdf>.*

Andrew Hodges, "Electronic Spin", [Online], 2003, pp. 1-9, [Retrived from Internet on Feb. 2, 2014], <http://www.turing.org.uk/publications/pcpro.html>.*

Microsoft Research, "Fast: a Transducer-Based Language for Tree Manipulation", [Online], 2012, pp. 1-10, [Retrieved from Internet on Feb. 2, 2014], <http://research.microsoft.com/en-us/um/people/livshits/papers/tr/fast_tr.pdf>.*

Wikipedia, "Turning completeness", [online], Apr. 17, 2010, [retrieved on Apr. 19, 2010], Retrieved from the Internet: <URL: http://en.wikipedia.org/w/index.php?title=Turing_completeness&printable=yes>, pp. 1-6.

Wikipedia, "Programming Language", [online], Sep. 28, 2010, [retrieved on Sep. 29, 2010], Retrieved from the Internet: <URL: http://en.wikipedia.org/w/index.php?title=Programming_language&printable=yes>, pp. 1-16.

"Automata, State, Actions, and Interactions", [online], [retrieved on Mar. 10, 2010], Retrieved from the Internet: <URL: http://www.ebpml.org/pi-calculus.htm>, pp. 1-5.

Wikipedia, "Pi calculus", [online], Mar. 5, 2010, [retrieved on Mar. 10, 2010], Retrieved from the Internet: <URL: http://en.wikipedia.org/w/index.php?title=Pi_calculus&printable=yes>, pp. 1-11.

"The Message Passing Interface (MPI) standard", [online], [retrieved on Mar. 10, 2010], Retrieved from the Internet: <URL: http://www.mcs.anl.gov/research/projects/mpi/>, pp. 1-2.

Wikipedia, "Message Passing Interface", [online], Mar. 8, 2010, [retrieved on Mar. 10, 2010], Retrieved from the Internet: <URL: http://en.wikipedia.org/w/index.php?title=Message_Passing_Interface&printable=yes>, pp. 1-14.

Jini.org, "Main page", [online], Mar. 8, 2007, [retrieved on Mar. 10, 2010],Retrieved from the Internet: <URL: http://www.jini.org/w/index.php?title=Main_Page&printable=yes>, pp. 1-6.

"LAM/MPI Parallel Computing", [online], Jul. 29, 2009, [retrieved on Mar. 10, 2010], Retrieved from the Internet: <URL: http://www.Iam-mpi.org/>, pp. 1-2.

Wikipedia, "Erlang", [online], Jan. 24, 2010, [retrieved on Mar. 10, 2010], Retrieved from the Internet: <URL: http://en.wikipedia.org/w/index.php?title=Erlang&printable=yes>, 1 page.

Wikipedia, "Computational complexity theory", [online], Sep. 5, 2010, [retrieved on Sep. 17, 2010], Retrieved from the Internet: <URL: http://en.wikipedia.org/w/index.php?title=Computational_complexity_theory&printable=yes>, pp. 1-14.

Wikipedia, "Category theory", [online], Nov. 28, 2010, [retrieved on Dec. 2, 2010], Retrieved from the Internet: <URL: http://en.wikipedia.org/w/index.php?title=Category_theory&printable=yes>, pp. 1-9.

Chandra et al., "Paxos Made Live—An Engineering Perspective", [online], Jun. 20, 2007 [retrieved on Aug. 6, 2010], Retrieved from the Internet: <URL: http://www.chandrakin.com/paper2.pdf>, 2007 ACM PODC 2007, pp. 1-16.

Ogawa et al., "Iterative-Free Program Analysis", [online], ICFP '03, Aug. 25-29, 2003, Uppsala, Sweden [retrieved on Sep. 17, 2010], Retrieved from the Internet: <URL: http://research.nii.ac.jp/~hu/pub/icfp03.pdf>, pp. 1-13.

Sasano et al., "Generation of Efficient Programs for Solving Maximum Multi-Marking Programs", [online], [retrieved on Aug. 17, 2010], Retrieved from the Internet: <URL: http://citeseerx.ist.psu.edu/viewdoc/summary?doi=10.1.1.5.9692>, pp. 1-13.

Sasano et al., "Make it Practical: A Generic Linear-Time Algorithm for Solving Maximum-Weightsum Problems", ACM ICFP 2000, [online], [retrieved on Aug. 17, 2010], Retrieved from the Internet: <URL: http://citeseerx.ist.psu.edu/viewdoc/summary?doi=10.1.1.5.7004>, pp. 1-13.

Wikipedia, "Boolean satisfiability problem", [online], [retrieved on Aug. 6, 2010], Retrieved from the Internet: <URL: http://en.wikipedia.org/wiki/Boolean_satisfiability_problem>, pp. 1-9.

Ramesh et al., "Nonlinear Pattern Matching in Trees", *Journal of the Association for Computing Machinery*, Apr. 1992, [online], [retrieved on Aug. 6, 2010], Retrieved from the Internet: <URL: http://citeseerx.ist.psu.edu/viewdoc/download?doi=10.1.187.2664& rep=rep1&type=pdf>vol. 39, No. 2, pp. 295-316.

Cai et al., "More Efficient Bottom-Up Multi-Pattern Matching in Trees" (1992) [online], [retrieved on Aug. 6, 2010], Retrieved from the Internet: <URL: http://citeseerx.ist.psu.edu/viewdoc/download;jsessionid=55996B64B7E81382DA93EC339B305F91?doi=10.1.1.35.1638&rep=rep1&type=pdf>, pp. 1-41.

Josh et al., "Denali: a goal-directed superoptimizer", Jul. 30, 2001, [online], [retrieved on Aug. 6, 2010], Retrieved from the Internet: <URL: http://citeseerx.ist.psu.edu/viewdoc/download;jsessionid=23B228827C25CC16ADC12CADB90187EF?doi=10.1.1.23.5676&rep=rep1&type=pdf>, cover sheets (3) and pp. 1-16.

Wikipedia, "Turing machine", [online], [retrieved on Apr. 30, 2010], Retrieved from the Internet: <URL: http://en.wikipedia.org/wiki/Turing_machine>, pp. 1-19.

Rojas, "A Tutorial Introduction to the Lambda Calculus", [online], [retrieved on Apr. 28, 2010]. Retrieved from the Internet: <URL: http://www.inf.fu-berlin.de/lehre/WS03/alpi/lambda.pdf>, pp. 1-9.

\* cited by examiner

SML Language, 16

-Total Functional Language and Does Not Permit Partial Functions

-Independent of any Hardware or Software-Specific Requirements of Any Computing System -Non-Turing Complete: All Functions Must Return a Result -Metalanguage for Describing Semantics of Functions in an Application: Application Written as Logical Specification -Application Functions Described Using at Least the Following Logical Types: Tuple, Sum, and/or Lambda Type

Figure 8

OPTIMIZING SYMBOL MANIPULATION LANGUAGE-BASED EXECUTABLE APPLICATIONS FOR DISTRIBUTED EXECUTION

TECHNICAL FIELD

The present disclosure generally relates to the writing, compiling, and execution of executable applications or programs on different computing systems having prescribed hardware and/or software specific requirements. More particularly, the present disclosure relates to executable applications or programs that are written for execution in a distributed computing environment.

BACKGROUND

This section describes approaches that could be employed, but does not necessarily describe approaches that previously have been conceived or employed. Hence, unless explicitly specified otherwise, any approaches described in this section are not prior art to the claims in this application, and any approaches described in this section are not admitted to be prior art by inclusion in this section.

Processor-based applications or programs to date have been written in accordance with constraints imposed by hardware-specific and/or software-specific constraints of the underlying computing system intended to execute the applications or programs. For example, assembly language instruction sets are designed for a specific processor circuit for manipulation of digital bits (i.e., having a value of either 0 or 1) that can be interpreted by the specific processor circuit either as an executable instruction, an address value for a register or memory location accessible by the specific processor circuit, or data: applications written using the assembly instruction sets must strictly follow the associated software and/or hardware based requirements of the assembly language instruction sets (e.g., syntax, etc.). Operating systems (e.g., Microsoft Windows XP®, Unix, Linux, etc.) provide a level of abstraction that enables application developers to ignore at least some of the hardware or software-based constraints of the specific processor circuit; however, such operating systems in return impose their own hardware and/or software based constraints that must be followed by an application executed using such operating systems to perform a prescribed function.

Consequently, substantial compatibility problems continue to exist when an attempt is made to employ an existing application (developed for a first computing system) on a second computing system that is not perfectly compatible with the first computing systems. Moreover, more complex computing systems are constantly being developed (e.g., newer processor circuits offering multithreading; parallel computing or blade computing; network-based distributed computing; cloud computing, etc.). Hence, application developers continue to confront the difficult requirement of understanding the features and requirements of the more complex computing system in order to modify existing applications for compatibility or develop a new application that operates without failure in the more complex computing system.

BRIEF DESCRIPTION OF THE DRAWINGS

Reference is made to the attached drawings, wherein elements having the same reference numeral designations represent like elements throughout and wherein:

FIG. 8 illustrates example attributes of the symbol manipulation language 16, according to an example embodiment.

DESCRIPTION OF EXAMPLE EMBODIMENTS

Overview

Figure 1:
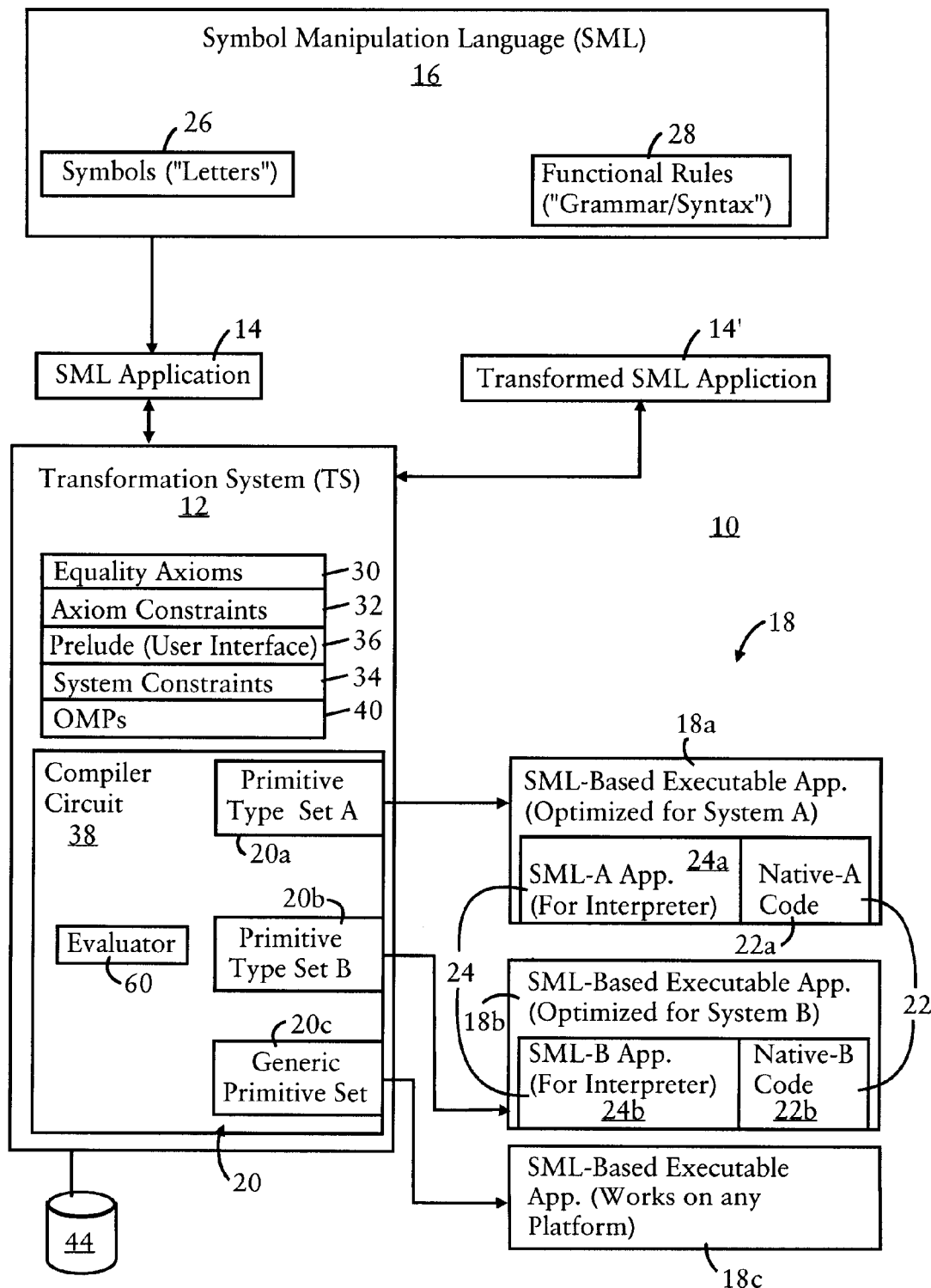
FIG. 1 illustrates an example system having an apparatus for executing optimization of an executable application written according to a prescribed symbol manipulation language (SML), according to an example embodiment.

In one embodiment, a method comprises receiving an application that describes functions according to a prescribed symbol manipulation language, the prescribed symbol manipulation language a non-Turing complete language that does not permit partial functions and is independent of any attribute of any computing system; generating one or more variants of the application based on executing a nondestructive transformation of the application relative to prescribed equality axioms, each variant of the application semantically equivalent to any other variant or to the application; and selecting one of the variants as an optimization for execution of the application by at least one apparatus relative to prescribed metrics.

In another embodiment, a method comprises receiving an application that describes functions according to a prescribed symbol manipulation language, the prescribed symbol manipulation language a non-Turing complete language that does not permit partial functions and describes the functions independent of any attribute of any computing system; identifying, in the application, a distribution annotation that identifies a candidate element in the application, the candidate element configured for execution in a distributed computing operation by a distributed computing system comprising two or more distributed computing devices; generating one or more variants of the application based on executing a nondestructive transformation of the application relative to prescribed equality axioms, at least one of the variants containing a corresponding semantically-equivalent variation of the candidate element; and selecting one of the variants as an optimization for execution of the application by the distributed computing system relative to prescribed metrics.

DETAILED DESCRIPTION

Outline of Detailed Description
I. INTRODUCTION
   A. Overview
   B. The Symbol Manipulation Language
   C. The Transformation System
      1. Overview
      2. Detailed Description of the Transformation System
         a. Super-Optimizing Compiler
            (1) Equality Axioms and Equality Graph
            (2) Matching and Rewriting
            (3) Optimality Search
   D. Feature Injection
      1. Example: Parallelization
      2. Example: Distributed Processing
   E. Self-Application
      1. Compiler
      2. Parallel-Prefix
   F. A Distributed Services Engine
      1. Evaluator
      2. Incremental Compilation
      3. Program Specialization
      4. Continuous Compilation
      5. Pareto Optimality
         a. Balanced Resource Utilization
         b. Quota Balancing
         c. Second-Order Optimization
      6. Native Compilation
   G. Catalog of Features for Injection
      1. Security and Compliance
      2. Fault-Tolerance
      3. Real-Time Guarantees
      4. Platform-Specific Hardware and Proprietary Extensions
      5. Network Management and Instrumentation
      6. Disconnected Operation
      7. Decentralization
      8. Persistence
II. Language Stack Having Segregated Language Primitives
III. Example SML Application: User Interface (Prelude)
IV. Example Hardware Overview
V. Automatic Partitioning of Program for Distributed Execution
VI. Automatic Partitioning of Program for Disconnected Operation
VII. Automatic Partitioning of Program for Security Policy Administration
I. Introduction Particular embodiments enable executable applications to be written in a manner that is completely independent of any attribute of any computing system, i.e., independent of any computing system deployment model. In particular, the executable applications are written according to a prescribed symbol manipulation language (SML).

The term "application" or "program" is defined as executable information stored on at least one non-transitory tangible medium and that can be configured for execution on one or more hardware-based processor circuits: the executable information can be stored as a single container (e.g., an executable file) on at least a single non-transitory tangible medium, described below; the executable information also can be stored as multiple components (e.g., fragments) on one or more non-transitory tangible media, where execution of the components by the same or distinct processor circuits can result in execution of the application (e.g., distributed computing). Unless specified otherwise, the execution of components by distinct processor circuits need not necessarily be concurrent, rather the components could be executed as distinct and independent events.

Deployment of any computing system requires establishing software or hardware specific requirements on the computing system. Hence, a "computing system deployment model" is defined herein as any computing system having at least one or more software or hardware specific requirements for deployment (i.e., physical and tangible execution) of the computing system. At least one software and/or hardware specific requirement of any computing system can be used to establish a "computing system deployment model". Hence, a computing system deployment model "A" will have at least one hardware or software specific requirement that distinguishes the computing system deployment model "A" from another computing system deployment model "B".

I.A. Overview

FIG. 1 is a diagram illustrating a system 10 having a transformation system 12 for execution of an SML application 14 according to a prescribed SML language 16, according to an example embodiment. The system 10 includes a transformation system 12 that is executed by at least one processor-based computing device (e.g., computing node 70 of FIG. 7) and configured for executing an optimization of an application 14 written according to a prescribed symbol manipulation language (SML) 16. The SML application 14 can be supplied to the transformation system 12 by a processor-based computing device (e.g., a client device such as a portable computer, web-enabled cellphone, etc.) that is distinct from the computing device (e.g., 70 of FIG. 7) executing the transformation system, for example via a network-based link (Ethernet link, Internet Protocol connection, etc.); alternately the client device and the transformation system 12 can be implemented within a single processor-based device.

Existing programming languages assume hardware-specific or software-specific parameters (i.e., requirements, constraints, etc.) for a particular computing system deployment model. Example hardware-specific requirements that have been assumed by existing programming languages for a particular computing system deployment model can include the type of microprocessor used (e.g., 32-bit or 64-bit, single core, dual core or multiple core, etc.), the manufacturer of the microprocessor (e.g., Intel processor vs. ARM processor or Motorola processor), whether the application is executed in a stand-alone computer, or in a network according to a prescribed computation model (e.g., client/server, peer to peer, distributed computing, etc.). Example software specific requirements that have been assumed by existing programming languages for a particular computing system deployment model can include the type of operating system in use (e.g., UNIX, Windows, etc.) or a given version of the operating system in use by the computing system deployment model.

The prescribed symbol manipulation language (SML) 16 is distinctly different from existing programming languages, in that the prescribed symbol manipulation language is a purely functional language that enables an executable application 14 to be expressed as a logical specification that describes functions to be executed by any computing system, independent of any hardware specific or software specific requirements of any computing system. In other words, the executable application 14 can be expressed as a manipulation of symbols consisting only of the symbol manipulation language 16 elements, described below, in a manner that is independent of any computing system deployment model. Consequently, any application 14 written in the prescribed symbol manipulation language 16 can have absolutely no relationship to any attribute of any computing system deployment model. Hence, any application 14 written in the prescribed symbol manipulation language 16 is completely independent of any software and/or hardware specific requirements of any computing system.

The transformation system 12 can provide a "mapping" between the application 14 and a a particular computing system deployment model, for example certain hardware-based computing systems. The transformation system 12 can provide this "mapping" based on executing a fully nondestructive logical transformation of the application 14 into a transformed application 14' that is semantically equivalent to the application 14. This fully nondestructive logical transformation enables an unlimited number of logical transformations, as required, between the original application 14 and multiple variations (e.g., 14', 18) of the original applications, where any one variation of the original application (i.e., program variant) can be an optimization for a prescribed computing system based on axioms and constraints that can be associated with a given computing system.

Figure 7:
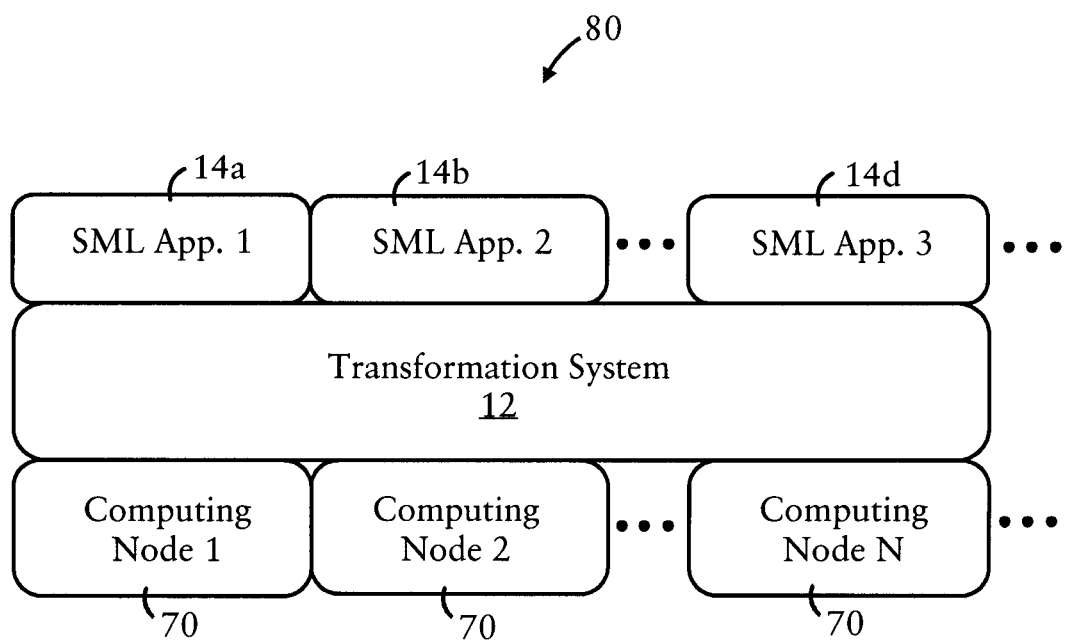
FIG. 7 illustrates execution of multiple SML applications by a distributed computing system having multiple computing nodes based on optimization by the transformation system of FIG. 1, according to an example embodiment.

The transformation system 12 can be configured for implementing a fully nondestructive logical transformation in the form of an optimization of the original SML-based application 14 and/or the transformed SML-based application 14' into an executable application 18 (e.g., 18a and/or 18b) based on prescribed hardware and/or software-specific requirements 20 (e.g., 20a and/or 20b) of a prescribed computing system deployment model (e.g., a distributed computing system 80 containing two or more computing nodes 70 as in FIG. 7). The executable application 18 generated by the transformation system 12 can include hardware and/or software-specific executable code 22 (e.g., 22a, 22b) optimized for the prescribed computing system deployment model. The executable application 18 also can include SML program elements 24 (e.g., 24a and/or 24b) that describe respective application function operations independent of any hardware or software-specific requirements of any computing system deployment model, and that are implemented by an SML program interpreter executed by the prescribed computing system deployment model.

I.B The Symbol Manipulation Language

FIG. 8 illustrates example attributes of the symbol manipulation language 16, according to an example embodiment. The symbol manipulation language 16 provides a logical specification for describing functions to be executed in a computing system deployment model, independent of any hardware-specific or software-specific requirements of any computing system deployment model. The symbol manipulation language 16 is a non-Turing complete language. Formally, the symbol manipulation language is a total functional language and does not permit partial functions. Unlike Turing-complete languages, all functions described in the symbol manipulation language 16 must return a result, i.e., no function described by the symbol manipulation language 16 is permitted to be executed without generating a result. Hence, Turing-complete functions that are capable of not generating a result (e.g., functions such as creation of an infinite loop, a branch to another location and that does not return, or a "do-while" that loops indefinitely) are considered "bottom" and are not permitted in the symbol manipulation language 16. A halt operation, required in Turing complete languages, also is not permitted in the symbol manipulation language 16.

In addition to the SML language 16 being a non-Turing complete and purely functional language, the SML language 16 also should be a higher-order language; the language 16 must be a strong and statically typed language: a language is "statically" typed only if all expressions have their types determined prior to execution of the application (e.g., determined during compilation); a language has a "strong typing" if it doesn't not permit one type to be treated as another type (e.g., treating an integer type as a string type). The symbol manipulation language 16 also must support "symbols" 26: a symbol 26 is a unique element (e.g., as in the Scheme programming language) that can be stored in one or more physical and tangible data structures (e.g., stored within at least one non-transitory storage medium 44) and that can be compared with another symbol. The symbol manipulation language 16 also must support the following operations by providing the appropriate syntactic rules 28: Pair and Projection operations (for constructing and destructing tuples, described blow); Tagged-Union and Case operations (for constructing and destructing union structures); Curry and Apply operations (for constructing and destructing new functions); Identity and Composition operations (for building complex operations from simpler ones).

The symbol manipulation language 16 also can provide support for Monads, Functors, Inductive and CoInductive types, Catamorphisms, and Anamorphisms. Example programming languages that can be used to implement the disclosed symbol manipulation language 16 can include Polymorphically Typed Lambda Calculus without Fixpoints, Charity, Joy, and subsets of Standard ML, Scheme, and Haskell. In one embodiment, the symbol manipulation language 16 can be implemented using a subset of Haskell.

The symbol manipulation language 16 provides a logical specification for describing functions to be executed in a computing system, in that the symbol manipulation language serves as a metalanguage for functions based on describing the semantics (i.e., the meanings) of the functions. In particular, a function is a transformation of one and only one input to one and only one output: as described below, an "input" and/or an "output" may be composed of multiple symbols 26, for example a "pair" as an input (e.g., a & b->c) or a "pair" as an output (e.g., a->(b & c)). The symbol manipulation language provides a logical specification for the description of the function, without describing the input or the output; rather, the symbol manipulation language can rely on an underlying polymorphic typed lambda calculus without Fixpoints. In particular, the functional relationship between inputs and outputs can be described in terms of logical "types", according to foundational mathematics, universal algebra and category theory: example logical types include at least a tuple, a sum, and a lambda type.

As described in further detail below, a given symbol 26 can be used to represent a particular value independent of form. In other words, a symbol 26 in one example represents a particular value that can be implemented as any one of an integer, string (alphanumeric), Boolean value (e.g., a bitmask), floating point, etc., without explicitly identifying the symbol as any one of the integer, string, Boolean value, floating point, etc. Note, however, that a symbol 26 is not a variable, because the value of a symbol 26 does not change: a symbol 26 is only ever one value, while a variable is some class of values, of which the variable currently is assigned one value at a time. Hence, a reference to an alphanumeric letter in this specification in quotes (e.g., "a") refers to a symbol 26, and not a variable, unless explicitly identified otherwise as a "variable".

Hence, the symbols "a" and "b" 26 in an expression can be used to express the relationship between "a" and "b", without identifying whether any one of the symbols is implemented as an integer, string, Boolen value, floating point, etc.

A tuple is a pairing (or association) between one symbol "a" and another symbol "b", for example enabling description of a function that maps from the inputs "a and b" (i.e., (a & b)) to an output: the inputs "a" and "b" can be of the same type (e.g., "a" is an integer and "b" is an integer) or different types (e.g., "a" is an integer and "b" is a floating point). A sum (i.e., coproduct) identifies a relationship between one symbol "a" and another symbol "b", for example enabling description of a function that maps an input "a or b" (i.e., a|b) to an output, where the inputs "a" and "b" can be either the same or different types; a sum also can be used to describe a conditional operation (e.g., "if . . . then").

A lambda type changes an existing function into a new function. The existing function (serving as an input to the lambda type) takes one pair as input and returns one output (a & b->c). The new function (output by the lambda type) takes one value as input, and returns a new function as output (a->(b->c)). The use of lambda types is the foundation for typed lambda calculus (excluding untyped lambda calculus).

These example logical types (tuples, sums and lambda types) can be used to derive additional functions or operations that combine symbols, for example products, exponentials, etc.

Hence, the symbol manipulation language 16 provides a logical and semantic specification for describing functions independent of any hardware-specific or software-specific requirements of any computing system, based on the tuple, sum, and lambda types that define the relationships between the symbols 26 that are manipulated by the functions. Category theory provides that repeating patterns can be described in a manner that is mathematically provable: the symbol manipulation language 16 is established based on defining a base category of symbols 26, and adding to the base category tuples, sums, and lambda types and other (optional) logical types that describe the functions to be performed.

By way of analogy, consider the construction of a building structure, for example a commercial office building or a home: the application written according to the prescribed symbol manipulation language is analogous to an architect's blueprint plan that can illustrate (graphically and with textual annotations) the structure of the building based on including plan views (e.g., floor plan views), elevation views, and/or cross-sectional views, without any details as to the specific construction techniques for implementing the blueprint plan. In other words, the same blueprint plan can be used to build the same building structure using different construction techniques, depending on the time the building structure is built or the particular building codes in effect at the building site.

Consequently, an application written according to a prescribed symbol manipulation language 16 as described herein is independent of any hardware and/or software-specific requirements of a prescribed computing system deployment model such as: explicit memory allocation, persistent storage, serial ordering constraints, messaging, threading, shared state, hardware access, operating system interaction, or real-time clocks. The symbol manipulation language 16 also is isolated from any and all interactions with any hardware or software attributes of the computing system deployment model, and isolated from any notion of the forward progression of time (e.g., as in runtime execution of an executable resource by the computing system).

In addition, since the symbol manipulation language 16 is based on category theory (which can provide mathematically-provable descriptions of repeating patterns), absolute backwards compatibility is guaranteed between a first application and a newer application. In particular, assume the first application is written in a first symbol manipulation language having an initial set of logical types. Assume further the newer application is written in a later symbol manipulation language having an expanded set of logical types that includes the initial set of logical types and newly added logical types having been discovered according to category theory. Category theory ensures that the first application written in the first symbol manipulation language is compatible with the newer application written in the later symbol manipulation language because the first symbol manipulation language is mathematically consistent with the later symbol manipulation language.

The application 14 written according to the prescribed symbol manipulation language 16 can be executed on any computing system deployment model based on execution of the application 14 by an interpreter that is native to the corresponding computing system deployment model (i.e., the interpreter is specific to the hardware and/or software requirements of the corresponding computing system deployment model).

I.C. The Transformation System

I.C.1. Overview

The transformation system 12 (TS) can be configured for evaluating an application 14 written according to a prescribed symbol manipulation language 16. The evaluation of the application 14 can be performed, for example, based on determining execution metrics for the application 14 relative to prescribed axioms 30, axiom constraints 32, system constraints 34, and/or computing system requirements that are expressed using optimization metrics programs (OMPs) 40.

The transformation system 12 also can be configured for executing an optimization of an application 14 written according to a prescribed symbol manipulation language 16. The optimization of the application can be based on executing a logical transformation of the application 14 into a transformed application 14', including logically converting (i.e., logically transforming) the initial application 14 (written according to a prescribed symbol manipulation language 16) into the transformed application 14' according to a set of prescribed axioms 30, axiom constraints 32, system constraints 34, and optimization metrics programs 40. The optimization of the initial application 14 into the transformed application 14' enables an application result to be completed more efficiently according to given criteria, and/or the optimization can provide additional features associated with execution of the transformed application (e.g., logging operations, auditing, distributed or parallel execution, etc.).

The logical transformation of the application 14 into the transformed application 14' can be based on logical conversions of prescribed patterns in the application 14 according to a set of prescribed axioms. For example, the transformation system 12 can be configured for identifying at least a first prescribed pattern in an application 14 written according to the symbol manipulation language (SML) 16, and logically converting the first prescribed pattern into a second prescribed pattern in the symbol manipulation language 16, the second prescribed pattern being semantically equivalent at the logical level to the first prescribed pattern according to prescribed rules 28 defining the semantic and functional manipulation of symbols 26. The first prescribed pattern can be converted into the second prescribed pattern based on a prescribed equality axiom 30 accessible by the transformation system 12 and that identifies the semantic equivalence between the first prescribed pattern and the second prescribed pattern. All prescribed axioms 30 (i.e., rules) are bidirectional, where conversion from the first prescribed pattern to the second prescribed pattern is nondestructive, enabling the second prescribed pattern to be converted back to the first prescribed pattern. Axioms 30 also can be associated with certain "axiom constraints" 32, described below, where certain prescribed conditions must be satisfied before the associated logical conversion can be performed. Example conditions can include checking the value of a variable, checking the type of an expression, etc.

Equality axioms 30 can be used to establish semantic equivalence between symbols 26 and/or symbol expressions written in the prescribed SML 16. Equality axioms also can be used to establish equivalence between a given symbol 26 (and/or symbol expression) and a hardware and/or software-specific expression for a prescribed computing system deployment model: the hardware and/or software-specific expression for the prescribed computing system deployment model can be defined according to a prescribed primitive type 20 for a manufacturer-specific configuration (e.g., Intel® processor vs. ARM processor), a prescribed computer processor architecture (e.g., single-core processor, multiple-core processor, parallel processors, etc.), and/or a prescribed computing architecture (e.g., single computing device, client-server, distributed, cloud computing, etc.).

An example axiom 30 can be a commutative property "$x*y=y*x$", where "$*$" represents a multiplication operation; another example axiom 30 can be a distributive property "$a*(b+c)=(a*b)+(a*c)$"; another example axiom 30 can be an associative property "$a+(b+c)=(a+b)+c$"; another example axiom 30 can be a sum-product transposition such as "$a+a=2*a$". New axioms also can be added as new logical types are discovered according to category theory and added to the later symbol manipulation language in the form of new symbols 26 and/or new functional rules 28, where the new axioms identify the semantic equivalence between the first prescribed pattern (e.g., prescribed patterns expressed using an initial set of logical types of the first symbol manipulation language), and the second prescribed pattern expressed using the newly added logical types of the later symbol manipulation language.

A prescribed equality axiom 30, in addition to identifying the semantic equivalence between a first prescribed pattern and a second prescribed pattern, also can impose restrictions (i.e., axiom constraints) 32 related to the first or second prescribed patterns, for example requiring an input/output identified in the first prescribed pattern must be a specific type (e.g., must be a specific tuple, sum, or lambda type), or that an identified function operating on an input must be maintained, etc. For example, one axiom 30 can impose a restriction 32 that a prescribed input must be a nonzero value (e.g., "$a/b=divide (a, b)$", where b does not equal 0") to ensure safe division. Hence, restrictions 32 can be imposed by the axiom 30 in the transformation between the first prescribed pattern and the second prescribed pattern. As described below, the combination of axiom constraints 32 and optimization metrics programs 40 enables feature injection, parallelization, distributed processing, incremental or continuous compilation, Pareto optimality, fault tolerance, real-time guarantees, platform-specific and/or proprietary extensions, network management, and/or disconnected operations.

The transformation system 12 also includes a prelude portion 36 and system constraints. The prelude portion 36, also referred to as a logical user language interface, is an executable application that can be written in the symbol manipulation language 16. The logical user language interface 36 provides a logical interface for application programmers based on providing a logically equivalent mapping between symbol manipulation language constructs and hardware-based and/or software-based concepts that often are employed by programmers experienced in hardware-based programming languages. For example, the logical user language interface 36 can provide a library that describes how hardware-based elements should be expressed in the symbol manipulation language 16 as interpreted by the transformation system 12. Example hardware-based elements that can be expressed by the prelude portion can include integers, Boolen operators and operands, data structures such as lists or trees, executing functions over functions, executing functions on data structures, etc.

System constraints 34 can define how the semantics of the application written according to the symbol manipulation language 16 are logically interpreted. Hence, the system constraints can ensure the application complies with the requirements of the symbol manipulation language (e.g., non-Turing complete, no partial functions, no operations resulting in "bottom" or halt operation, that all operations are derived from tuple, sum, and/or lambda logical types etc.). System constraints 34 also can include security-based constraints (e.g., the application must be hashed and coded according to a prescribed security key, etc.).

The transformation system 12 also includes a compiler circuit 38. The transformation system 12 can supply the initial application 14 and/or the transformed application 14' to the compiler circuit 38, which can be configured for mapping the logical types and operations specified in the supplied application (e.g., 14 and/or 14') to computing machine-specific (i.e., native) types and native operations for a prescribed machine-executable computing system deployment model. The mapping of logical types and operations of the supplied application to native types and operations enables the bidirectional (i.e., nondestructive) converting of the supplied application into an executable application 18 that can include executable code 22 optimized for the prescribed computing system deployment model based on the prescribed set of primitive types 20 (e.g., 20a, 20b and/or 20c) that describe any hardware-specific and/or software-specific requirements of the computing system deployment model.

In particular, a primitive type 20 is a base type of input or output from which all other logical types are polymorphically derived: example primitive types 20 can include integer, string (alphanumeric), Boolean (e.g., a bit-mask), floating point, etc. For example, a 32-bit data value stored in a 32-bit memory location can represent an integer, an alphanumeric string (e.g., one or more ASCII characters), a Boolean value (e.g., a bit mask), or a floating point value, depending on the hardware or software constraints applied to the 32-bit memory location.

Additional hardware-specific primitive types can include methods for execution or computation, for example a "remote" primitive type 20 for requesting an operation be performed by a remote machine, a "local" primitive type 20 for specifying that an operation must be performed by the local machine, and/or an "any" primitive type for specifying that an operation can be performed locally or remotely. Hence, a primitive type 20 can provide a hardware-specific and/or software-specific description of a given computing system deployment model. These primitive types 20 can be used to establish equality axioms 30 that can specify a semantic equivalence between a purely functional expression in the SML application 14 and a hardware-specific and/or software-specific expression that describes a particular hardware-specific and/or software-specific attribute of a given computing system deployment model. Hence, the equality axioms 30 can provide a nondestructive (and reversible) mapping between a purely functional expression in the SML application 14 and a hardware-specific and/or software-specific expression of a given computing system deployment model. Primitive types 20 are described in further detail below in Section II of this Detailed Description.

As described below, the primitive types 20 can be supplied to the transformation system 12 at different times, for example during installation or deployment of the compiler circuit 38 (e.g., based on initial compilation of an SML application 14 implementing the compiler circuit 38), during supply of a new SML application 14 that is to be optimized for a new computing system deployment model, etc.

Hence, the compiler can map a logical type or operation to a machine-specific primitive type, enabling prescribed patterns of symbols and/or operations expressed in the supplied application to be represented as a prescribed machine word for greater execution efficiency.

I.C.2. Detailed Description of the Transformation System

The prescribed symbol manipulation language 16 enables the development of distributed services designed to enable whole-program semantic analysis. Any application 14 written in the SML 16 may be constrained by prescribed policies and constraints 32 and/or 36 for security and compliance; the application 14 also can be reorganized by the transformation system 12 for distributed or parallel execution; any manipulation, reorganization, and/or optimization of the application 14 can be paused, stored in a storage medium 44, and resumed at any time.

The transformation system 12 is configured for whole-program semantic optimization, also referred to as super-optimization, which achieves near-optimal resource utilization for any hardware or software-based computing system deployment model. This super-optimization by the transformation system 12 is future-proof, such that any new platform or newly defined resource concern may be added retroactively to all software applications 14 written according to the SML 16.

Figure 2:
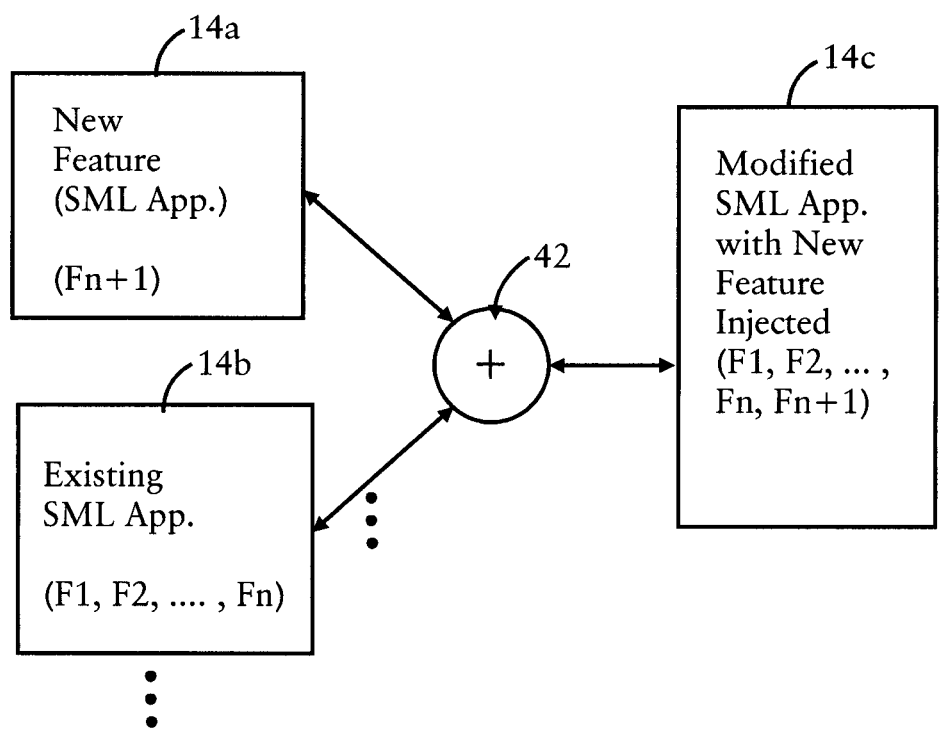
FIG. 2 illustrates an example combining example SML applications into a modified SML application, and splitting the modified SML application into multiple SML application components, according to an example embodiment.

The transformation system 12 is configured for leveraging super-optimization to inject new features into existing software applications, and a catalog of features to be injected, for example features such as security, distribution, decentralization, fault-tolerance, etc. As illustrated in FIG. 2 and described in further detail below, new features can be injected based on the transformation system 12 injecting a new application 14a containing the new feature (e.g., feature "Fn+1") into an existing application 14b having existing features "e.g., "F1, F2, . . . , Fn"), and executing the super-optimization 42 for generation of the modified application 14c containing the existing features and the new feature (e.g., "F1, F2, . . . , Fn, Fn+1").

As described in further detailed below, each original version of an SML application 14 can be retained (e.g., in the storage 44); hence, the original version of an SML application 14 can be recompiled into new variants at any time, for example as new equality axioms 30, new primitive type sets 20, and/or new program fragments (e.g., 14a of FIG. 2) become available. Since the combination of the SML application 14a with the SML application 14b is semantically equivalent to the modified application 14c, and since the original versions of the SML applications 14a and 14b also can be retained by the transformation system 12, the transformation system 12 also can effectively split the modified application 14c into the original application components 14a and 14b, or any variation thereof (including tens, hundreds, thousands, etc. of application components 14 and/or replicas thereof) as desired depending on the preferred optimization for a given computing system deployment model (e.g., client/server computing, peer to peer computing, distributed computing, cloud computing, etc.).

The injecting, splitting, and/or replicating of an application 14 by the compilation and execution infrastructure of the transformation system 12 enables the transformation system 12 to build a distributed transaction processor (similar to a relational database system), and enables the transformation system 12 to provide a series of efficiency improvements based on relevant optimization operations.

The flexibility afforded by the SML 16 of providing a purely functional application 14 providing full semantic analysis enables any one or all of the components 30, 32, 34, 36, 38 and/or 40 to be written in the SML 16, allowing future implementers to build next-generation systems from a stable, mature base.

As described in further detail below, the design of the SML 14 and compiler circuit 38, and selection of features for injection can provide a solution for the recurring problems of distributed computing.

I.C.2.a Super-Optimizing Compiler

The compiler circuit 38 can be configured as a "super-optimizing" compiler, where the term "super-optimizing" is defined as the near-optimal resource utilization for a prescribed hardware and/or software-based computing system deployment model. In other words, any one of the applications 14, 14' and/or 18b of FIG. 1 can be executed by a prescribed system A (e.g., using an interpreter executed by the prescribed system A), however the application 18a is optimized for execution by the system A.

A particular feature of the example embodiments of the transformation system 12, as described in Section I.B above, is that time complexity of the compiler circuit 38 can be reduced to mere linear time based on accepting restrictions on the input programs 14 and axioms (expressed as axiom constraints 32). Hence, the compiler circuit 38 can execute compilation to optimality for large software projects in a practical timeframe.

I.C.2.a.(1) Equality Axioms and Equality Graph

Traditional compilers manipulate a program graph, which encodes the program being compiled: the traditional compiler iteratively performs a series of analysis/transform "passes". The program graph typically is destructively updated during each "pass" by the traditional compiler, until the program graph is modified to its final compiled form. Hence, destructive updates lose additional opportunities for transformation depending on the order in which passes are applied.

Figure 3:
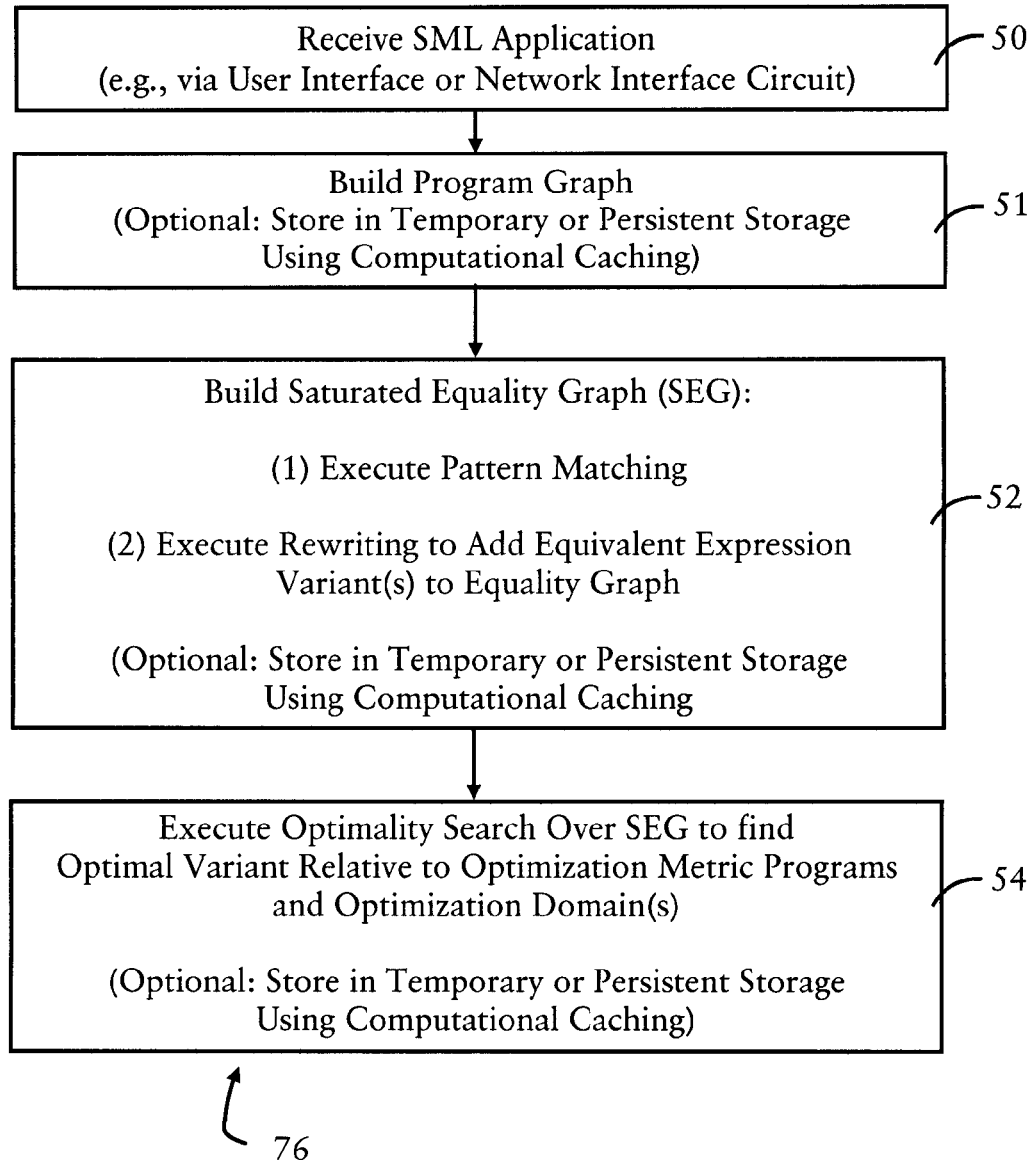
FIG. 3 illustrates example non-destructible compiling operations executed by the compiler of FIG. 1, according to an example embodiment.

FIG. 3 illustrates example non-destructible compiling operations 76 executed by the compiler of FIG. 1, according to an example embodiment. The disclosed compiler circuit (i.e., super-optimizer) 38 receives an SML application 14 (e.g., via a user interface circuit or a network interface circuit) in step 50, and generates in step 51a program graph (e.g., stored in storage 44), but does not perform destructive updates. The compiler circuit 38 retains in step 52 both the old and new versions of program graphs based on building and storing (e.g., in storage 44) a composite data structure 56, illustrated in FIGS. 4A-4D, called an Equality Graph (EG). The compiler circuit 38 can be configured to share internal nodes of the equality graph, enabling storage of an exponential number of program variants in a linear amount of space, to provide practical compilation.

The traditional execution of analysis/transform passes in the traditional compiler are replaced in the example compiler circuit 38 by a single two-phase process, illustrated in steps 52 and 54: in step 52, Equality Axioms 30 are repeatedly instantiated on the Equality Graph 56 based on executing pattern matching until no more equalities can be found, then an optimality search is executed in step 54 over the saturated equality graph data structure 56 to find an optimal program variant 46.

An Equality Axiom 30 is a mathematical relationship between two equations. In this case the equations must be semantically equivalent, such as "a+b=b+a". Equality axioms 30 declare that the two equations "mean" the same thing intrinsically. This declaration of equivalence by an equality axiom 30 enables the compiler circuit 38 to instantiate the axiom whenever it finds a pattern of code matching one side of the equation, adding a new variant of the equation by rewriting it to match the other side of the axiom.

The compiler circuit 38 can be supplied with a set of axioms 30 by default, and new axioms 30 can be included in the submitted programs 14, according to prescribed security constraints described below.

Experimental testing has proven the effectiveness of superoptimizing compilation on a variety of hardware platforms including commercially-available ARM® and Intel® technologies, and a large subset of the Java language.

FIGS. 4A, 4B, 4C, and 4D illustrate an example of superoptimization, illustrated based on Joshi et al., "Denali: A Goal-Directed Superoptimizer". The inputs are a program, a set of axioms, and optionally a user-specified optimization metric (e.g., 40 of FIG. 1). The axioms are:

axiom: $4=2^{**}2$
axiom: $k^{*}(2^{**}n)=k<<n$
axiom: $k^{*}4+n=s4addl(k,n)$ (an assembly language instruction)

The input program to be optimized is:
program: $(reg6^{*}4)+1$

Figure 4A:
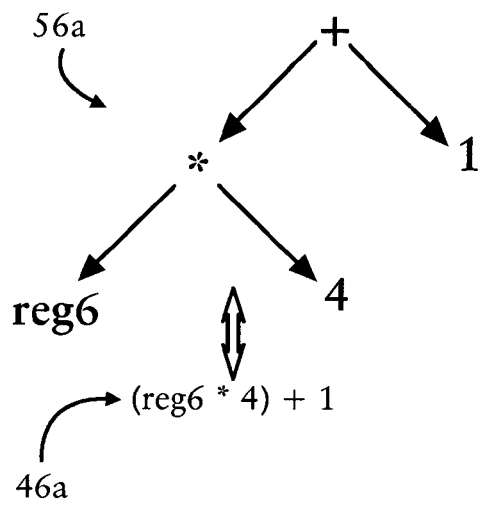
FIGS. 4A-4D illustrate example equality graphs that are generated by the compiler of FIG. 1 for optimization of an executable application according to an example embodiment.
Figure 4B:
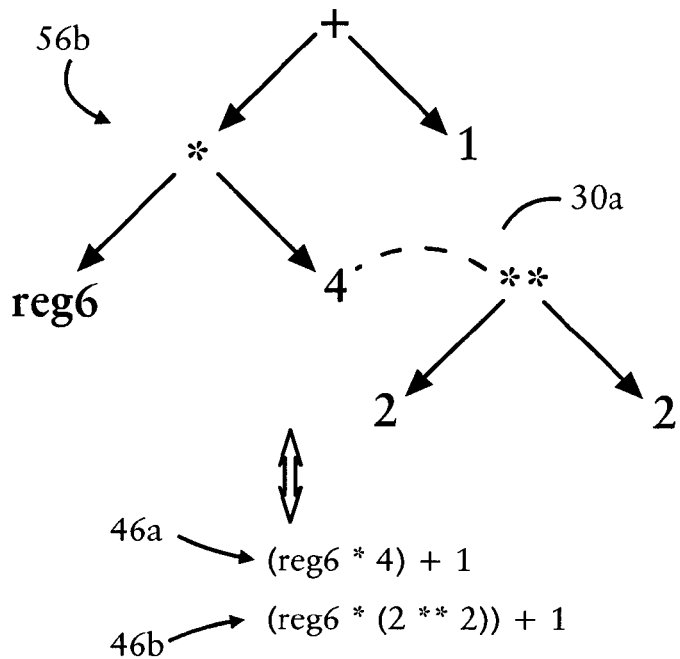
Figure 4C:
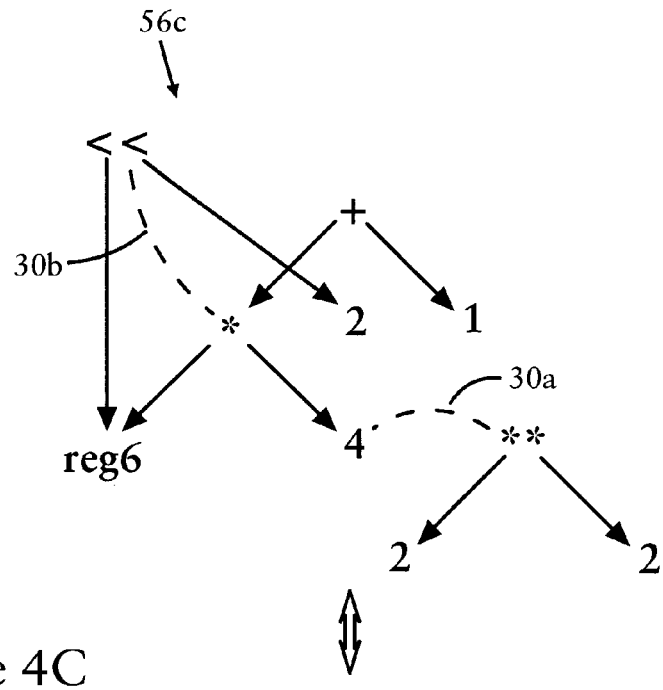
Figure 4D:
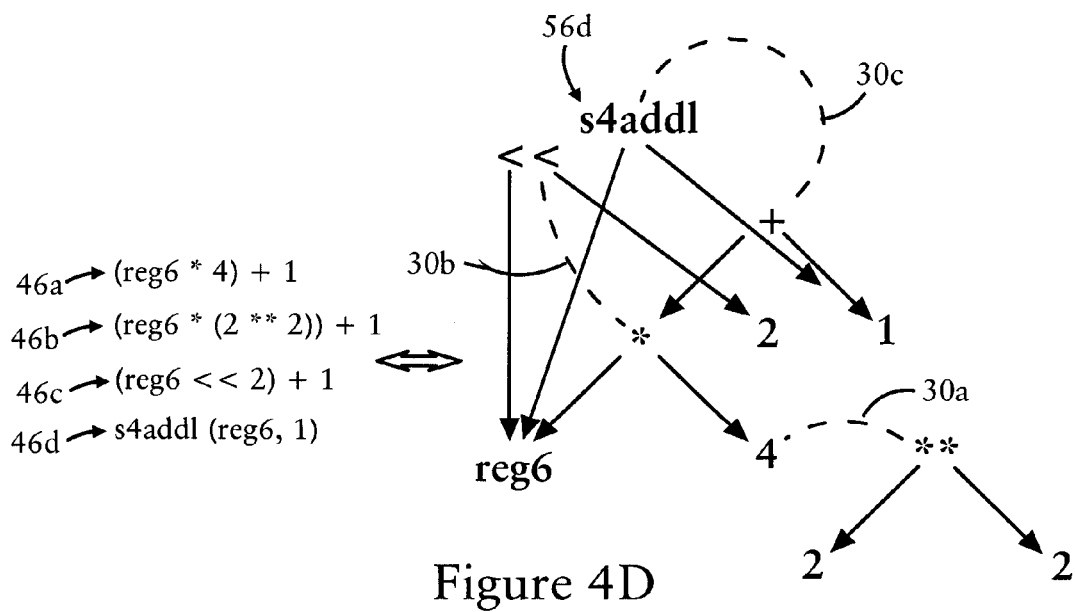

In this example, the compiler circuit 38 can parse the input program in step 51 of FIG. 3 into an initial equality graph 56a representing an initial program variant 46a, illustrated in FIG. 4A. Solid lines represent data-flow edges, while nodes represent operations. The match/rewrite phase executed by the compiler circuit 38 in step 52 can repeatedly instantiate equality axioms 30 to create new program variants, illustrated in FIGS. 4B, 4C, and 4D. FIG. 4B illustrates the equality graph 56b based on the compiler circuit 38 instantiating and implementing the equality axiom "$4=2^{**}2$" 30a. The equality graph 56b provides a representation of the equivalent program variants 46a and 46b, where dashed lines represent equality constraints. FIG. 4C illustrates the equality graph 56c based on the compiler circuit 38 instantiating the equality axiom "$k^{*}(2^{**}n)=k<<n$" 30b (where k=reg6, n=2), the equality graph 56b providing a representation of the equivalent program variants 46a, 46b, and 46c. FIG. 4D illustrates the equality graph 56d based on the compiler circuit 38 instantiating the equality axiom "$k^{*}4+n=s4addl(k,n)$" 30c (where k=reg6, n=1), the equality graph 56d providing a representation of the equivalent program variants 46a, 46b, 46c, and 46d. Any one of the equality graphs 56a, 56b, 56c, and/or 56d (and/or their respective program variants 46) can be stored in storage 44 by the compiler circuit 38.

Hence, FIG. 4A illustrates the initial equality graph (EG) 56a consisting of a single program variant 46a; FIG. 4B illustrates the equality graph 56b containing two distinct program variants 46a and 46b; FIG. 4C illustrates the equality graph 56c containing three distinct program variants 46a, 46b, and 46c; and FIG. 4D illustrates the equality graph 56d containing four distinct program variants 46a, 46b, 46c, and 46d, including a platform-specific (e.g., a hardware and/or software-specific) program variant 46d based on an axiom 30c that combines shift and summation operations. Since no more axioms can be instantiated in this example, the equality graph 56d is deemed "saturated" as a Saturated Equality Graph (SEG). Hence, the saturated equality graph 56d contains four equivalent expression variants, i.e., program variants: "$(reg6^{*}4)+1$" 46a; "$(reg6^{*}(2^{**}2))+1$" 46b; "$(reg6<<2)+1$" 46c; and "s4addl (reg6, 1)" 46d.

Figure 5:
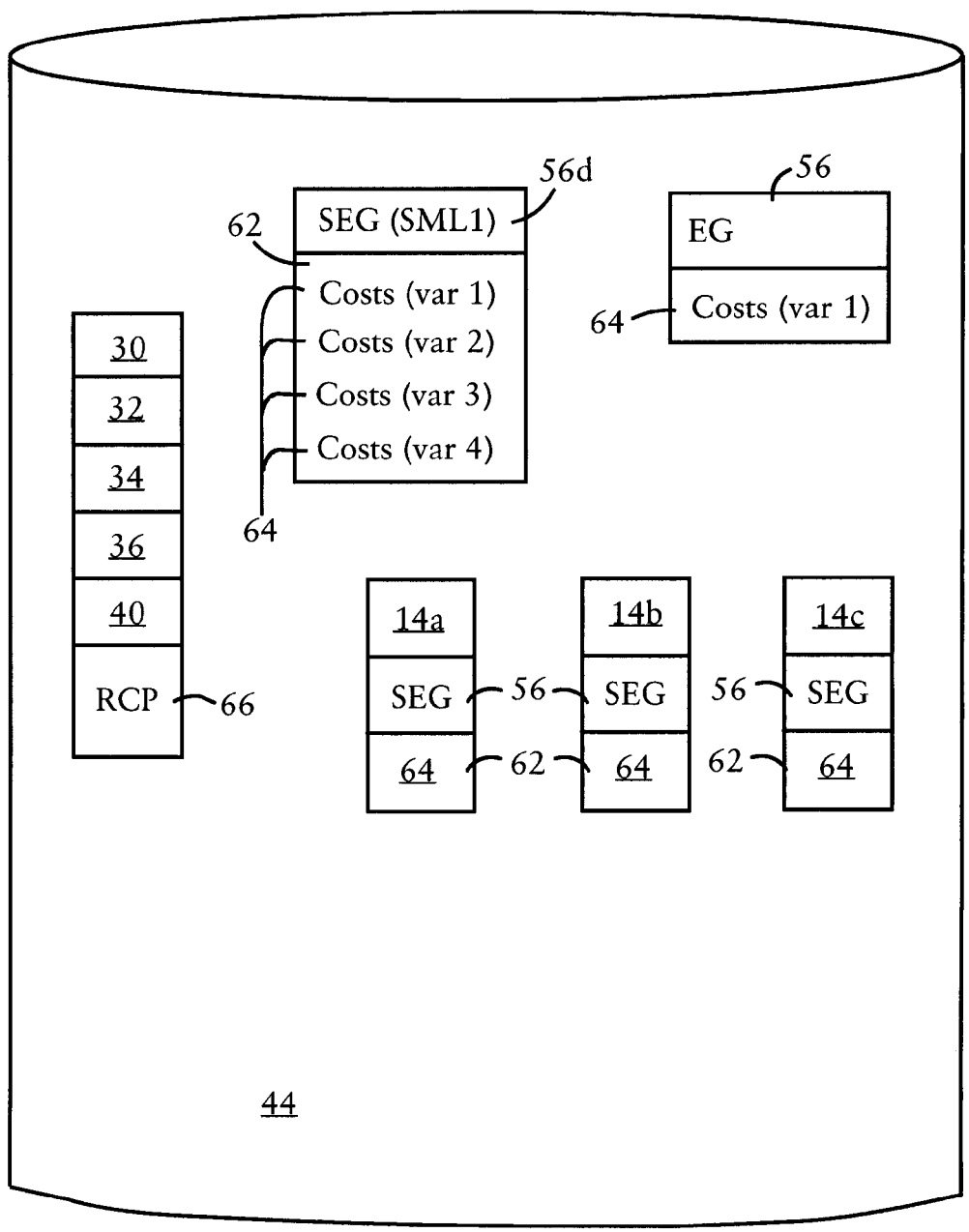
FIG. 5 illustrates examples data structures stored in the tangible memory medium of FIG. 1, according to an example embodiment.

Once the equality graph 56 is saturated (e.g., as in FIG. 4D), the compiler circuit 38 can initiate optimization in step 54 of FIG. 3. In particular, the compiler circuit 38 can calculate a cost variant 64 for each program variant 46, the cost variant 64 specifying a corresponding resource utilization for one or more computing systems. The relative costs of each program variant 46 can be stored in the storage 44, illustrated in FIG. 5 as a cost file 62 configured for storing one or more cost variants 64 for a corresponding one or more program variant 46. Each cost variant 64 can include one or more cost parameters (e.g., CPU utilization, memory space requirements, input/output (I/O) bandwidth, etc.). As illustrated in FIG. 5, the storage 44 contains, for the saturated equality graph 56d of FIG. 4D (identified in FIG. 5 as "SEG(SML1)"), a cost file 62 containing cost variants 64 for each of the above-illustrated program variants 46. For example, the cost variant "costs (var1)" 64 is associated with the program variant "$(reg6^{*}4)+1$" 46a; the cost variant "costs (var2)" 64 is associated with the program variant "$(reg6^{*}(2^{**}2))+1$" 46b; the cost variant "costs (var3)" 64 is associated with the program variant "$(reg6<<2)+1$" 46c; and the cost variant "costs (var4) 64 is associated with the program variant "s4addl (reg6, 1)" 46d.

The minimum-cost variant 64 is selected as the output of the compiler based on applying the relevant optimization metrics programs 40, described below for example in Section I.F.5.

I.C.2.a.(2). Matching and Rewriting

The first task of the compiler circuit 38 is to locate nodes in the equality graph 56 that match the pattern for an equality axiom 30.

Axiom matching by the compiler circuit 38 on a program graph for an application 14 written in SML 16 can be implemented as an example of the "tree multi-pattern matching problem". This problem can be solved by the compiler circuit 38 in O(N+M) time, where N represents the size of the input (program graph to be searched) and M represents the number of matches found, as illustrated by Cai et al., "More Efficient Bottom-Up Multi-Pattern Matching in Trees" and Ramesh et al., "Nonlinear pattern matching in trees". Hence, the compiler circuit 38 can complete axiom-based pattern matching in step 52 at near-linear time efficiency.

The compiler circuit 38 can execute step 52 based on pre-processing the equality axioms 30, allowing individual matches to be recognized in O(k) time. The parameter "k" represents the maximum function arity, i.e., the number of arguments that a function can accept: in the example embodiment of the SML language, the value of "k" is the constant "2", i.e., "k=2". Working from the leaves of the equality graph (e.g., 56a), the compiler circuit 38 can assign an identifier that represents the set of all possible matching axioms to each node in the tree 56. As the compiler circuit 38 moves up the tree 56, the compiler circuit 38 can combine sets for each child (max O(k) children per node) to generate the parent's identifier (a total of O(N) times).

Matches are implicit in the combined identifiers. For each match, the compiler circuit 38 can perform rewrites, O(M) times total. Thus this procedure has complexity of about O(kN+M).

Another aspect of an SML-based application 14 is that the compiler circuit 38 can generate non-standard program graphs in some cases, which are guaranteed to be Directed Acyclic Graphs (DAGs). When operating on a DAG, the compiler circuit 38 can execute the matching and rewriting of step 52 in parallel to achieve the desired time bounds, since each new rewrite may add a (local, constant-size) sub-DAG to the equality graph—requiring recomputation of the match sets over the affected region.

Hence, the compiler circuit 38 can perform matching and rewriting in step 52 for an SML-based application 14 in O(N+M) time, storing each of the associated results in the storage 44. While the bounds on M depends greatly on the axioms used, prior super-optimization projects have reported manageable expansion factors.

According to an example embodiment, the equality axioms 30 preferably (but not necessarily) should be term equalities with O(1) guard predicates. This captures a wide variety of axioms illustrated in Table 1:

TABLE 1

EXAMPLE AXIOMS

| | |
|---|---|
| axiom: a + (b + c) = (a + b) + c | associativity |
| axiom: a + b = b + a | commutativity |
| axiom: a * (b + c) = (a * b) + (a * c) | distributivity |
| axiom: f · f = f | idempotence |
| axiom: a + a = 2 * a | sum/product transpose |
| axiom: a = a * 1 \| a :: Integer | general transpose 1 |
| axiom: (a * b) + b = (1 + a) * b \| a :: Integer, b :: Integer | general transpose 2 |
| axiom: a == b = a == c \| b == c | transitivity |
| axiom: a/b = divide (a, b) \| b != 0 | safe division |

I.C. 2.a.(3). Optimality Search

The second task of the compiler circuit 38 is to select the optimal solution out of the possible billions of variations offered by the equality graph 56. The compiler circuit 38 utilizes optimization metrics programs (OMPs) 40, illustrated in FIG. 1, to execute optimization. The OMPs 40 can be executable programs written in SML 16 and which can calculate the "cost" of an operation, for example based on modeling the resources expended by the operation on an identifiable computing system deployment model. OMPs 40 can be used by the compiler circuit 38 to model abstract resources such as operation counts, memory allocation, and I/O bandwidth, or advanced chip features such as processor pipelines, and support chips such as ASICs.

The compiler circuit 38 can be supplied with a default set of OMPs 40, and new OMPs 40 can be specified within the submitted SML application 14.

Although a Boolean Satisfiability procedure could be used to search for the optimal program, the compiler circuit 38 can be configured to utilize a class of solutions for the Maximum Marking Problem (which covers some nondeterministic polynomial time (NP)-class problems such as subset sum and the knapsack problem for combinatorial optimization). In particular, the compiler circuit 38 can achieve linear-time optimality searches by restricting internal computations to finite domains, and constructing specialized constraints on the solution. The compiler can convert the maximum marking problem into a dynamic programming problem, which is solvable in O(N) time (where N is the size of the input).

Specifically, the compiler circuit 38 can achieve linear-time optimization based on: the output program graph being a singly rooted DAG; each node offering one or more variations to compute the result, only one of which can be marked to choose program variants (although this restriction could exclude some transformations such as program specialization (i.e. partial evaluation), these can be recovered as described below in Section I.F.). In addition, the cost 46 of a program variant 56 can be the simple sum of all marked nodes' cost. The implication of this restriction is that some metrics might not be possible, for example some advanced pipelining. Another requirement is that costs as determined during execution of any of the OMPs 40 must be finite, non-negative integers.

Hence, the compiler circuit 38 determines the optimal program as the program variant 56 that has the lowest cost variant 64. The compiler circuit 38 also can store the parameters associated with identifying the numerous program variants and respective costs, including the optimized program variant having the lowest cost, as a data structure in the storage 44. When used as the search phase for the super-optimizer of the compiler circuit 38, the input is size O(N+M). Thus the cost for optimality search is O(N+M), providing near-linear time compilation. If, however, near-linear time compilation is not required, certain of the aforementioned restrictions can be removed to gain additional expressivity of the equality axioms 30 or optimized metrics programs (OMPs) 40 at the cost of extended compile times; the extended compile times, however, still produce transformed applications 14' and/or 18 in an efficient manner.

Hence, the storage of the equality graph 56 (e.g., EG or SEG) and/or the program variants 46 (and optionally the respective cost variants 64) in the storage 44 enables non-destructible (and reversible) compiling operations by the compiler circuit 38, including guaranteeing future-proof compatibility between different program versions. As described below in Section I.F.2, the storage of the equality graph 56, the program variants 46, and/or the respective cost variants 64 also enables incremental compilation.

I.D. Feature Injection

Feature Injection is the process of the transformation system 12 using automated program-generation techniques, illustrated in FIG. 2, to add functionality to an existing program (e.g., 14b). The restrictions imposed by the application 14 written according to SML 16 provide flexibility to automatically inject features written into arbitrary applications 14 written according to SML 16 using super-optimization by the compiler circuit 38. Further, the constraints imposed by SML essentially eliminate all system state, and enable execution of programs 14 to achieve the illusion of sequential access and persistent resources.

I.D.1. Example: Parallelization

Feature injection by the transformation system 12 can be illustrated by parallelization.

Feature injection can be performed by the transformation system 12 using super-optimization based on the operation of the new feature being described in an independent module (e.g., the SML based application 14a of FIG. 2), then inserting equality axioms 30 and/or axiom constraints 32 into the transformation system 12 which equate common operations in a program 14 (e.g., 14b) with new (but equivalent) operations which make use of the features included in the independent module (14a).

Parallelization tends to occur locally within a single chassis containing multiple computing devices (e.g., processor-based devices such as "blade servers"), or distributed across a cluster of similar nodes 70 that are interconnected by physical communication links (e.g., high speed data bus, or network communication link). FIG. 7 illustrates execution of multiple SML applications 14a, 14b, and 14d across multiple computing nodes 70 based on optimization by the transformation system 12, according to an example embodiment. In the example of parallelization, the computing nodes 70 can be implemented as multiple computing devices such as blade servers within a single chassis, or computing devices interconnected by physical communications links such as a high speed data bus.

An example of this feature injection by the transformation system is Map-Parallelization. Functional programmers can "map" a function over a list of values. That is, a function can be applied to each value in the list, in turn generating a new list. This can be referred to as vector processing, while CPU manufacturers can refer to it as Single instruction, multiple data (SIMD). A typical map operation can be illustrated as follows:
    let z=map f [a, b, c, d]
    in . . .
        which assigns z=[(f a), (f b), (f c), (f d)]

This illustrated map operation can be performed in parallel by the compiler circuit 38 for each value in the list, recombining the results into a new list at the end. Assuming the transformation system 12 has access to threading, SIMD, or vector processing primitives, the transformation system 12 can be configured to apply an available axiom 30 which matches the "map" operation and causes the compiler 38 to replace the "map" operation with a parallel processing operation written in a separate module, for example:
    A parallel version of the map function from a library:
        ParallelMap fn 1st
    axiom: map fn 1st=ParallelMap fn 1st
This axiom "map fn 1st=ParallelMap fn 1st" declares that the "map" function and the "ParallelMap" function are equivalent for all inputs. After the match and rewrite phase is executed by the compiler circuit 38 as described previously in Section I.C.2.a.(2), the equality graph generated by the compiler circuit 38 (and which can be stored in the tangible storage medium 44) would contain two different versions of the program:
    1) let z=map f [a, b, c, d]—map f over the list serially
        in . . .
    2) let z=ParallelMap f [a, b, c, d]—map f over the list in parallel
        in . . .

The super-optimizer executed by the compiler circuit 38 then can compute metrics over both versions (i.e., program variant) and select the one program variant the compiler circuit 38 discovers to be optimal according to the relevant optimization metric programs 40. If the resource model tracked by the OMPs 40 shows that the thread pool is overtaxed, or the overhead cost for setting up the vector-processing unit outweighs the benefits, then the optimizer executed by the compiler circuit 38 would compute the result using the serial implementation.

The map-parallelization axiom is an example of a class of more general "fold" parallel axioms, which covers a broad range of parallelism over collections of items. Programs transformed by the compiler circuit 38 using these axioms can provide acceleration for operations over the collections.

Another example parallelization axiom 30 is Tuple-Parallelization:
    axiom: (f, g)=ParallelPair f g In a pure functional language such as the prescribed SML 16, the functions f and g are guaranteed to be independent and may be computed concurrently. This axiom "(f, g)=ParallelPair f g" annotates the operations in a pair (or tuple) as being parallelizable. The optimizer executed by the compiler circuit 38 can apply metrics 40 to determine if this operation would benefit from parallelization, and select the best option.

This is an example of a more general class of parallelization axioms over sub-computations embedded in inductive data types. Programs transformed by the transformation system 12 using these axioms provide acceleration when sub-computations take roughly the same amount of time to compute (thus minimizing synchronization delays).

A complete feature injection by the transformation system 12 for parallelization of an arbitrary application 14 would perform many such rewrites using a plurality of special-case axioms. Additionally, larger structural adjustments to the program 14 can be made by the transformation system 12 to expose the maximum number of parallelization opportunities. This can be the best possible parallel version of the program (given the available axioms) because super-optimizer executed by the compiler circuit 38 captures all equivalent versions of the program, and the optimality search by the compiler circuit 38 selects the globally optimal version (given the supplied metrics 40). This is possible due to the constraints imposed by the symbol manipulation language 16. For example, a programmer is not permitted to define hardware-specific operations, for example explicitly launching threads or defining synchronization points.

I.D.2. Example: Distributed Processing

As described previously, parallelization tends to occur locally within a single chassis containing multiple computing devices (e.g., processor-based devices such as "blade servers"), or distributed across a cluster of similar computing nodes 70 that are interconnected by physical communication links (e.g., high speed data bus, or network communication link). In contrast, distributed processing can include computing devices of the same or widely varying capacities (including unique special-purpose hardware), the computing devices configured as network nodes communicating over an unreliable network with varying link capacities and transmission characteristics (e.g., local area network (LAN) or wide area network (WAN) connections). Hence, FIG. 7 can illustrate distributed processing, where each computing device 70 can be implemented as a network node communicating with other computing nodes via LAN or WAN links. Such a computing device configured as a network node for communication with other network nodes, and configured for executing a distributed computation in response to a request from another computing device, also can be referred to as a "remote node".

In one embodiment, the transformation system 12 can be configured to successfully inject distributed processing capabilities into arbitrary applications 14. Logically, any independent sub-computation (illustrated as 14a in FIG. 2) can be copied or split (i.e., partitioned) from an existing application (e.g., 14c of FIG. 2) and distributed to another computing device implemented as a network node in the network.

The example embodiments, as illustrated by the transformation system 12, can address issues such as choosing what computation to distribute (i.e., copy and/or partition and send), which network node should be sent the distributed computation, when to send the request for executing the distributed computation, and how the request should be processed. The example embodiments also can address the dynamic nature of a distributed system: lost, delayed, and corrupted messages, network partitions, erroneous or malicious nodes, etc.

In one embodiment, axioms 30 are provided that partition the application into all possible independent sub-computations: example axioms are illustrated in Table 2.

TABLE 2

DISTRIBUTED PROCESSING AXIOM EXAMPLES

| | |
|---|---|
| axiom: Remote (Int a) = Int a | Constants and trivial computations are not sent remotely (e.g. an integer). |
| axiom: (Remote a, Remote b) = Remote (a, b) | Pairs of remote computations are combined. |
| axiom: Lambda (Remote a) = Remote (Lambda a) | Functions consisting of remote operations are remote functions. |
| axiom: (Remote f) (Remote a) = Remote (f a) | Applications of remote operands are combined. |
| axiom: (Remote f) · (Remote g) = Remote (f · g) | Composition of remote functions is a remote composition. |
| axiom: if (Remote p) then (Remote c) else (Remote a) = Remote (if p then c else a) | Comparison of remote values is a remote comparison. |
| axiom: Remote (Remote a) = Remote a | Flatten nested remotes. |

Additional axioms 30 are added to the transformation system 12 that combine sub-computations if the sub-computations could be beneficially merged on the remote node. Additional axioms 30 and optimization metrics programs (OMPs) 40 also can be added that enable tradeoffs between resources such as number of messages vs. message size. Additional examples are illustrated in Table 4 below in Section V.

The super-optimization process executed by the compiler circuit 38 can select a program variant that optimizes the model exposed by the metrics 40. For instance, if the metrics 40 executed by the compiler circuit 38 select for fastest computation of the result, then a program variant can be chosen by the compiler circuit 38 such that the cost of sending the computation remotely is masked by work that needs to be performed locally.

With another set of metrics 40, the program variant chosen by the compiler circuit 38 can ensure multiple nodes compute the same result (for fault-tolerance), or that a particular class of node is always chosen to perform a critical step of the procedure (perhaps due to policy compliance), etc. Hence, a particular program variant may be chosen for optimization of a particular metric.

Experimental testing of the transformation system 12 according to the example embodiment led to the discovery by the inventors of synergy between independent sets of axioms 30, for example the optimization axioms 30 and the distribution axioms 30: the distribution axioms gathered as many remote computations as possible into a single operation, allowing a significant reduction in the number of messages transmitted; hence, the distribution axioms exposed additional opportunities to apply the optimization axioms to the newly coalesced remote computations, for example to eliminate redundant sub-expressions which may reduce the total bytes transmitted. Hence, the combined use of the optimization axioms and the distribution axioms defined not only a protocol for exchanging computation, but also a self-regulated granularity for the application's application programming interface (API) over a network. Such optimization can be performed by the transformation system 12 automatically and optimally for each application 14 in the system 10.

I.E. Self-Application

1.E.1 Compiler

The compiler circuit 38 is implemented based on writing an SML application 14 expressing the compiler operations according to the prescribed symbol manipulation language (SML) 16, and causing the SML application 14 expressing the compiler operations to compile itself as described previously in Section I.C.2, including causing the SML application 14 to build a program graph in step 51 of FIG. 3, applying the equality axioms 30 to generate a saturated equality graph in step 52, and causing the SML application 14 to execute in step 54 an optimality search over the saturated equality graph to determine the optimal variants using the OMPs 40. The optimized SML application 14 (identified by its saturated equality graph 56, its optimized program variant and associated lowest cost variant 64) can be stored in the storage 44, enabling dynamic updates and optimization of the compiler circuit 38. The optimized SML application 14 also can be reduced to a hardware-specific platform, for example an application-specific integrated circuit (ASIC), if preferred.

Hence, future implementers can extend the transformation system 12 at every level, as well as bestowing the system all benefits provided to its applications: distributed, parallel, fault-tolerant, super-optimized, etc. This self-applied version of the compiler is the basis for the design of a distributed services engine discussed in Section I.F. below.

I.E.2. Parallel-Prefix

The deployment of parallelization among a large number of processors is different from that of parallelizing on a few processors. The example embodiments can be implemented as a distributed system with potentially millions of processors.

The example embodiments impose restrictions on the form of the solution, such that partial results can be combined to achieve the final result. Data-parallel procedures are a fine-grained many-processor parallelism which assumes communication is the bottleneck (rather than computation).

The example embodiments require the function to be parallelized to be a monoid: binary, closed, associative, has an identity element, and is not required to be commutative. These restrictions enable fine-grained parallelism, which scales down smoothly, ensuring the best possible parallelism for commercially-available hardware (up to the size of the problem). Hence, the function can be computed in O(log N) communication steps.

According to one example embodiment, a "Bottom-up Tree Multi-Pattern Matching" technique is used because it fits the monoid requirements, allowing efficient parallelization when self-compiled in the transformation system 12.

The optimality search procedure does not meet the monoid requirements, but dynamic programming can be profitably distributable, enabling the optimality search to be implemented using parallelization.

I.F. A Distributed Services Engine

The compiler circuit 38 can be implemented based on batch-processing a single source SML application 14 into a single executable application 18. The compiler circuit 38 also can be implemented as a complete distributed services engine based on the compiler circuit 38 including an evaluator circuit 60, illustrated in FIG. 1.

The compiler circuit 38 and the evaluator circuit 60 in combination can immediately compile and evaluate incoming program fragments (e.g., 14 of FIG. 1 and/or 14a of FIG. 2). Results from the immediate compiling and evaluating of the incoming program fragments (e.g., 14 and/or 14*a*) can be returned to a submitting client device either as a transformed application (e.g., 14' of FIG. 1) or as part of a modified application (e.g., 14*c* of FIG. 2) based on the incoming program fragment (14*a* of FIG. 2) and another existing SML application (14*b* of FIG. 2). As illustrated in FIG. 5, the results (e.g., 14' of FIG. 1 or 14*c* of FIG. 2) and the associated graphs 56 and cost variants 64 also can be stored in a non-transitory storage (e.g., storage device 44) for later retrieval. Since results can contain functions as well as values, the transformation system 12 can implement behaviors needed for distributed services.

I.F.1. Evaluator

The evaluator circuit 60 can implement a runtime infrastructure required to execute an SML application 14 compiled according to the symbol manipulation language 16 and associated constraints 32, 34, and is analogous to a C runtime library, or a Java Virtual Machine. The evaluator circuit 60 for the SML 16 is configured for providing a non-destructive association with the hardware-specific and/or software-specific attributes of the computing system deployment model that are required for execution of the SML application 16, example attributes including: memory management, persistence, networking, etc.

The evaluator circuit 60 can be implemented using any programming language (including SML 16). The evaluator circuit 60 also can be supplied a program (e.g., SML application 14) in a form of byte code, or statically linked with the program (e.g., 14) as a native library that is loaded and executed by the compiler circuit 38 during the compilation process. Executable programs used to implement the evaluator circuit 60 can be general such that they work on any hardware or software platform, or specially designed and implemented (e.g., as a hardware-based logic circuit such as an application specific integrated circuit (FPGA)) for a particular platform or purpose.

At a minimum, any executable application 14 for a given computing system deployment model that is used to implement the evaluator circuit 60 must provide a primitive set 20 that establishes a nondestructive equivalence between native versions (i.e., hardware and/or software specific expressions) of each primitive in the SML language 16, enabling all programs 14 to work with all evaluator circuits 60. Beyond this minimum, an evaluator circuit 60 can expose additional primitives, such as threading, vector processing, persistent storage, databases, networking, or other platform-specific features, described below in further detail in Section II. These features can be used when associated equality axioms 30 and metrics 40 are provided to the compiler circuit 38.

Thus, an SML application 14 compiled for an evaluator circuit 60 with persistence can cause the evaluator circuit 60 to store or retrieve data from a storage medium 44 during the computation of its results. The same SML application 14 compiled for an evaluator circuit 60 with networking could operate as a distributed computation.

I.F.2. Incremental Compilation

Example embodiments disclosed herein can implement distributed services. New SML applications 14 (e.g., applications, services, transactions), and axioms constraints (e.g., constraints, policies) 32 can submitted to the transformation system 12 continuously. As described in Section I.C.2.a.(1) previously, traditional compilers iteratively performed destructive updates to a program graph of a program. Hence, prior systems required each program to be recompiled "from scratch" (i.e., starting with a new program graph) each and every time, even if the same program is submitted multiple times (such as a recurring query to a database).

In one example embodiment, the compiler circuit 38 can utilize previous compilation results (stored, for example, in the storage 44), and perform only the incremental compilation for work that is new. As described above in Section I.C, the storage 44 can store the saturated equality graph 56, the associated program variants, and respective cost variants 64 associated with compiling a given SML application 14. Hence, according to the example embodiment, an incremental version of the matching procedure can be utilized.

A Monoid-Annotated Binary Tree as described in Section I.E above can convert a parallel-prefix procedure into an incremental procedure. The benefit of an incremental procedure is that updates to the equality graph structure (e.g., the saturated equality graph 56*d* of FIG. 4D) can occur within $O(\log(N+M))$ time, as opposed to $O(N+M)$ time for the batch procedure. Since our match procedure was selected to meet the requirements for parallel-prefix, it also meets the requirements for monoid-annotated binary trees.

The benefits of an incremental system multiply as the system grows; if multiple programs 14 use the same module, or multiple transactions call the same sub-function, the majority of the work for these shared components has already been performed.

I.F.3. Program Specialization

As described previously in Section I.C.2.a.(3), the restricted form of solutions returned by the near-linear time super-optimizer could exclude some transformations.

Program specialization is a class of transformations normally provided in a computing system deployment model providing distributed services. Program specialization operates on "program fragments" as opposed to complete (or "closed") programs.

Program specialization is excluded by the restrictions imposed by axiom constraints 32 and/or system constraints 34 because a specialized version of a program may duplicate a function and optimize each copy differently. The transformation system 12, however, is configured for optimizing each copy of the function the same way. Without program specialization, however, program fragments wait for all their arguments before computation begins.

According to an example embodiment, program specialization can be implemented as an additional transformation option, following generation of a transformed SML application 14', that enables nondestructive optimization of program fragments if platform-specific capabilities are available. As described below, unique abilities of a particular computing node (e.g., platform-specific capabilities) can be utilized to perform optimized transformations that may not be possible on another node. Hence, the transformed SML application 14' having an additional transformation option can be executed as an optimization for a particular computing node comprising the platform-specific capabilities, relative to the transformed SML application 14' that does not include the transformation option. If platform-specific capabilities are not available (e.g., the particular computing node is not available), the transformed SML application 14' can still be executable by a generic computing system deployment model that lacks particular computing node because the optimization of the transformed SML application 14' is nondestructive. As stated previously, since the transformed SML application 14' is semantically equivalent to the original SML application 14, the original SML application also can be optimized to any particular computing system deployment model.

Hence, although a generic computing node may not be able to execute a transformed SML application 14' as efficiently as a particular computing node having platform-specific capabilities, the transformed SML application 14' still can be executed by the generic computing node with no loss of functionality.

I.F.4. Continuous Compilation

As described previously in Section I.C.2.a.(3), intermediate and final compilation results (e.g., the equality graphs 56 of FIGS. 4A-4D and associated cost variants 64) can be stored by the compiler circuit 38 in the storage 44. Further, these intermediate and final compilation results are fully nondestructive and semantically equivalent, enabling further optimizations as existing operations are further optimized or new operations are added. Hence, the use of a previously cached optimal compilation result can provide a significant performance improvement.

Hence, the transformation system 12 can be configured for continuous compilation, where applications are continually optimized by the transformation system 12 as new SML applications 14 and/or new equality axioms 30 are added.

In one example embodiment, continuous compilation can be executed by the transformation system 12 applying a "competitive compilation analysis" as follows.

In response to receiving an SML application 14, the transformation system 12 can be configured for generating and storing in the storage 44 two copies of the received SML application 14: an "active" copy 14a which represents the dynamic partial results, and a "static" copy used for incremental compilation. Data structures in the storage 44 can be shared to provide a negligible increase in memory. The transformation system 12 can be configured for causing the compiler circuit 38 to evaluate the active copy of the SML application 14, based on an arbitrary execution plan; for example, the compiler circuit 38 can be configured to determine the relevant cost variants 64 for execution of (or during execution of) the received, un-optimized version of the SML application 14.

The transformation system 12 also can cause the compiler circuit 38 to execute the matching and rewriting, and optimization search on the static copy, as described in Section I.C.2.a, preferably concurrently with the evaluation of the active copy.

The compiler circuit 38 evaluates the active copy, as described in as described in Section I.C.2.a, relative to the arbitrary execution plan. In response to the compiler circuit 38 completing evaluation of an identified sub-branch of the active copy, the compiler circuit 38 replaces the identified sub-branch in the active copy with the corresponding sub-branch of the equality graph 56 for the active copy as determined by the compiler circuit 38.

If the compiler circuit 38 identifies an execution plan for the static copy that requires less time to complete the corresponding evaluation than the remaining time required to evaluate the active copy according to the arbitrary execution plan, the compiler circuit 38 can terminate and discard the evaluation of the active copy according to the arbitrary execution plan and begin evaluating the more-optimal static copy according to the identified execution plan.

The foregoing "competitive compilation analysis" can be coupled with incremental compilation as described in Section I.F.2, such that the results of the initial execution of compiling a received program could be cached in the storage 44 (e.g., as a partially-evaluated equality graph (EG) 56 or a saturated equality graph (SEG) 56 with associated cost variants 64, enabling subsequent compilations to be accelerated based on retrieving the cached results.

I.F.5. Pareto Optimality

A Pareto Optimal solution balances trade-offs among competing constraints or "trade-offs" (e.g., price vs. performance, execution time vs. memory, bandwidth vs. quality, etc.), such that any improvement that can be made in one constraint measured along one axis requires sacrificing some constraint that is measured along another axis. Prior methods for software improvement and analysis required heuristics to select among such competing tradeoffs. Such heuristics are known to be either inaccurate or detrimental in some domains. For example, the decision to inline a function during compilation may allow application of constant folding and other optimizations, but causes code growth which raises cache pressure (i.e., cache memory size requirements), possibly slowing the computation down significantly as a result. In any sufficiently-interesting domain containing competing constraints (such as software optimization), a separation of solutions emerges: Fully-dominated solutions, which are always undesirable; or Non-Dominated solutions representing "trade-offs" of available resources. Heuristic software optimizers cannot distinguish between these clusters of solutions, and often produce fully-dominated (undesirable) results.

Some existing projects attempt to achieve "pure" optimization (at some granularity) by thorough analysis of the search space, selecting the "optimal" result. These projects pre-select a resource to optimize, such that no 'trade-offs' can occur; their result is optimal only from the perspective of optimizing consumption of the chosen resource.

Pareto optimal solutions typically form a set, called the Pareto Frontier, in which all solutions are equivalent under the constraints.

According to an example embodiment and as described previously, the equality axioms 30 and optimization metric programs (OMPs) 40 can be used by the transformation system 12 to analyze applications 14 supplied to the transformation system 12 and generate transformed applications 14' from an equality graph (e.g., 56d of FIG. 4D). As described previously, the equality-graph (e.g., 56d) can contain a sufficiently-complete graph of the semantics-preserving software transformation solution space. This solution space contains (nominally) all possible transformations of the input program, including all possible trade-offs of resource usage.

Figure 6:
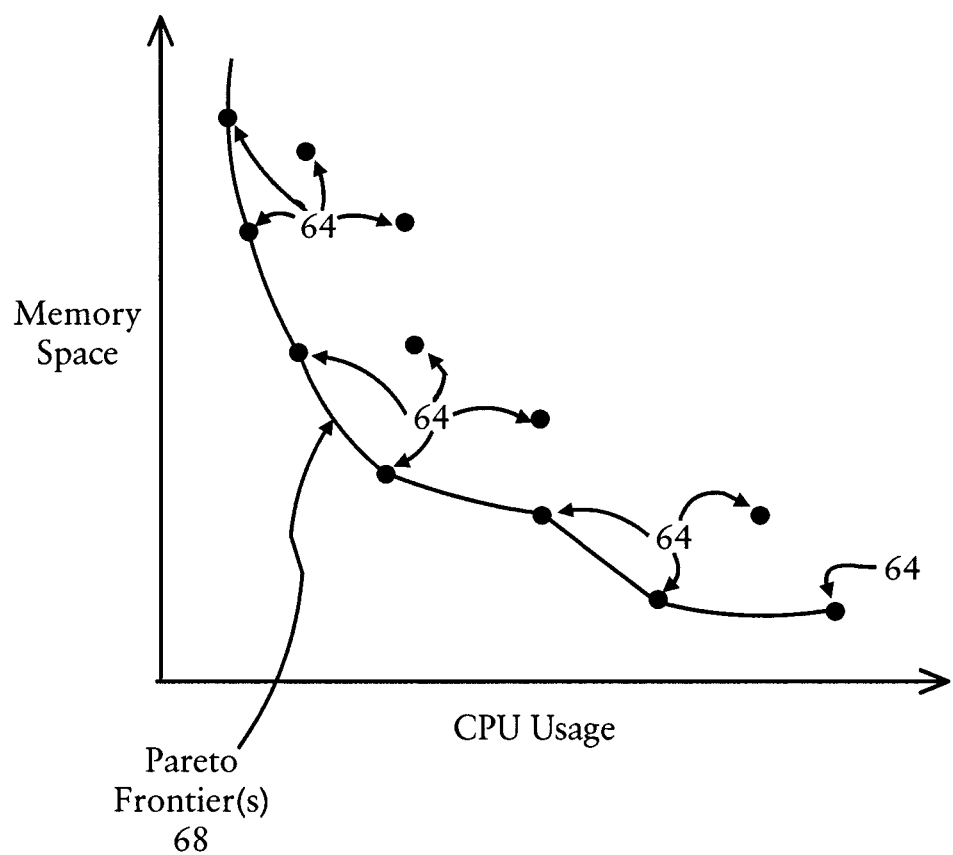
FIG. 6 illustrates and example pareto frontier generated by the compiler of FIG. 1 based on determining cost variants for respective program variants, according to an example embodiment.

According to an example embodiment, these equality axioms 30 and OMPs 40 can be used by the transformation system 12 to generate pareto frontiers (PF) 68, illustrated in FIG. 6, based on the cost variants 64 for the respective program variants 46. For example, one program variant 46 from the saturated equality graph 56d may have a corresponding cost variant 64 that requires less CPU utilization but more memory space (e.g., Random Access Memory (RAM) space), while another program variant from the saturated equality graph 56d may have a corresponding cost variant 64 that uses less RAM space but requires more CPU utilization or other requirements (e.g., network bandwidth utilization, etc.). In the absence of additional constraints 32 or 34 (RAM limits, CPU quotas, etc), these program variants can be selected arbitrarily.

According to an example embodiment, the arbitrary selection of program variants 46 from the saturated equality graph 56 introduces an opportunity for additional design elements for compiler optimizations, described below.

As illustrated in FIG. 4D and FIG. 5, each program variant 46 of the equality graph 56 has a corresponding cost variant 64: the corresponding cost variant 64 can be annotated into the equality graph 56, for example based on adding to each node of the equality graph an index value that uniquely identifies the corresponding cost variant 64. Hence, the saturated equality graph (e.g., 56d) of FIG. 4D can be annotated with resource consumption metrics for identification of the associated costs 64 across multiple cost dimensions. The availability of searching the saturated equality graph relative to multiple cost dimensions, based on the respective costs 64, enables the compiler circuit 38 to execute optimization based on one or more optimization domains, each optimization domain including a corresponding set of optimization metrics. For example, one optimization domain may specify optimization metrics for execution by a single computing device 70 (e.g., in disconnected mode), such as CPU utilization, memory space requirements, etc.; other optimization domains can specify optimization metrics for partitioning an SML application 14 according to various criteria, for example administration of security policy (discussed in Section VII. below), execution by a remote computing node 70 that at various times could be disconnected from a network (discussed in Sections I.G.6 and VI. below), or distributed execution by a distributed computing system 80 having multiple computing nodes 70 (discussed in Section V. below).

The Pareto optimization described herein can be implemented for use in any one of multiple execution environments. For example, the Pareto optimization can be used as any one of: a "front-end" of a multi-stage compiler (e.g., to annotate software fragments for targeted transformations by future stages); a "back-end" of a compiler framework which reduces the result of domain-specialized transformations to a final output language; and/or a "whole" or "complete compiler" that reduces a saturated equality graph (e.g., 56d of FIG. 4D) via semantic transformations into the transformed application (e.g., 14' and/or 18).

A particular feature of the example embodiment is that the compiler circuit 38 can be configured for executing pruning operations on the saturated equality graph to improve search efficiency. Pruning can become particularly effective as the input SML application 14 and/or the available domains of execution systems (as described in their respective optimization metric programs 40) increase in complexity. For example, a commonly-recurring sub-region of the equivalence space in the saturated equality graph 56 may be quite large, but have only a few useful nodes. Based on the compiler circuit 38 pre-generating these regions and pruning the undesirable nodes, a large number of repetitive instantiations of the sub-region may be avoided. For example, a given platform can have a precise hierarchy of mathematical primitives for multiplication (e.g., bit-mask, sum, shift, multiply). Once this hierarchy is explored by the compiler circuit 38, all future instances of multiplication may enjoy the result, there is no need to re-instance the graph.

Software optimization axioms might include infinite-expansions (such as: a=a+0). These expansions are rarely useful beyond one instance (e.g., a+0 may be useful, but a+0+0 is unlikely to be). By limiting the instantiating of these axioms, the compiler circuit 38 can avoid infinite model growth.

Improvements in resource consumption occur at a higher rate for abstract code fragments, as opposed to low-level register or native operations. These larger, algorithmic improvements are typically always-desirable selections when appropriate (e.g., Radix Sort vs Bubble Sort, Hash Map vs. Bin Tree Map). Pre-calculating algorithmic selection for a given problem instance by the compiler circuit 38 eliminates large, undesirable, search areas.

Pruning also can be used by the compiler circuit 38 to remove trade-offs or program variants 64 in the Pareto frontier 68 that are uninteresting or unrealistic. For example, a large class of trade-offs or program variants 64 can result in implementations that consume unrealistic amounts of computing system resources, for example an input SML application 14 that should only take seconds to finish could be transformed to a program variant 64 that requires weeks to complete execution, but which only consumes a few bytes of memory; in this example, the compiler circuit 38 can prune such program variants 64 providing unrealistic solutions from the saturated equality graph.

Pruning for removal of unrealistic trade-offs or program variants 64 can be implemented based on applying feasibility constraints relative to an ideal computation (e.g., given an average set of computation resources, what would a typical computation consumed); the feasibility constraints can be defined, relative to the ideal computation, to limit the instantiation of program variants to those which use less than an order of magnitude more of any resource. Hence, the use of feasibility constraints relative to an ideal computation is distinct from existing optimization techniques that rely on specific metrics of allowed solutions (referred to as feasible solution constraints), where the feasible solution constraints must be specified in relation to the available variables in the implemented solution (i.e., CPU utilization must be less than 100 units, memory utilization must be less than 10 gigabytes, bandwidth utilization must be less than 64 kilobits per second, etc.). Hence, the feasibility constraints relative to an ideal computation can be applied by the compiler circuit 38 both for executing pruning of a saturated equality graph 56, as well as defining practical and effective feasible solution constraints.

Pareto optimization by the compiler circuit 38 also can be applied to leverage platform-specific capabilities, described in further detail below in Section I.G.4. In summary, existing techniques cannot leverage specialized hardware capabilities for large-scale application restructuring. For example; a program which uses cryptography cannot be automatically translated to use a hardware crypto accelerator device.

According to an example embodiment, the compiler circuit 38 can be configured to apply Pareto optimization in order to select a hardware accelerator if the overall resource utilization would be improved. Note that non-pareto techniques would unanimously select a hardware accelerator if it is available; creating a bottleneck for access to the device. Pareto-techniques would balance access to the existing hardware and overflow requirements would be supplied by other resources (CPU, remote machines, etc).

The use of Pareto optimization by the compiler circuit 38 also eliminates the requirements for metric weights and transformation order. In particular, existing techniques require weight formulas for combining metrics as well as order-of-application for software transformations. According to an example embodiment, the compiler circuit 38 eliminates these requirements, allowing any number of metrics and transformations to be intermixed without specification of ordering or weights.

The use of Pareto optimization by the compiler circuit 38 also enables transformations at all levels of granularity to be intermixed. In contrast, existing software transformation frameworks typically provide transformations at a single (or narrow band) of granularity; peephole optimizers provide re-arrangement of several assembly instructions, traditional compilers provide for transforming a single function, advanced compilers provide for transformations over a single module, etc.

In contrast, the compiler circuit 38 enables transformation of all levels of granularity to be intermixed, such that large-scale algorithmic transformations (e.g., quick sort versus bubble sort) can be specified along side platform-specific "peephole" optimizations. Hence, the compiler circuit 38 efficiency improvements by selecting a concrete solution from a set of solutions with a range of resource trade-offs. The compiler circuit 38 also balances utilization of available resources, maximizing work performed. The compiler circuit 38 also allows a range of optimization time vs resulting efficiency improvements which are consistent; additional resources assigned to perform software improvements are guaranteed to discover improvements, if they exist. Execution time may range from just-in-time compilation to full-system inter-module optimization.

The compiler circuit 38 also does not rely on ad-hoc heuristics to select transformations. A transformation is selected only if its result achieves improvement in the resulting metrics. The compiler circuit 38 also can select platform-specific capabilities (such as hardware accelerators, or specialized ASICs), without requiring the software developer to plan for this capability. Further, the compiler circuit eliminates the requirement for assigning metric weights when combining independently developed resource consumption metrics, and eliminates any requirement for selecting an order to apply transformations.

I.F.5.a. Balanced Resource Utilization

A processor-based computing node, executing a continuously running service engine, can be configured for tracking available resources (RAM, CPU time, I/O bandwidth, etc) over time, and storing the tracked resources as a resource consumption profile (RCP) 66 in the storage 44 of FIG. 5. The resource consumption profile 66 can specify actual resource consumption or expected resource consumption.

In response to initiating compiling an application 14, the processor-based computing node executing the transformation system 12 can retrieve an (expected) resource consumption profile 66: the retrieved resource consumption profile 66 can be used by the compiler circuit 38 to identify one or more of the cost variants 64 along the pareto frontier 68 and having the closest correlation to the retrieved resource consumption profile. Hence, the compiler circuit 38 can identify the one or more optimal program variants 46 based on identifying the respective one or more cost variants 64 along the pareto frontier 68 and having the closest correlation to the retrieved resource consumption profile 66. Hence, the transformation system 12 can identify the optimum program variant 46 from the pareto frontier 68 which balances the consumption of available resources. This balanced resource utilization can optimize the system as a whole, translating into higher utilization. Consequently, the Pareto optimization by the compiler circuit 38 may apply balanced resource utilization to transform an input SML application 14 in order to fit current or expected resource availability over a short timeframe: this technique can be particularly effective in transaction processing.

I.F.5.b. Quota Balancing

If users of a computing system executing the transformation system 12 (or applications 14 executed by the computing system) are assigned resource quotas, then the compiler circuit 38 can select the program variant 46 which balances the consumption of the available quota.

For example, if a user's storage quota is under-utilized, then a pareto optimal solution which uses more storage and less CPU/RAM could be chosen. This would conserve the sparse remaining quota for future requests.

I.F.5.c Second-Order Optimization

Execution of an application by a computing system does not instantaneously produce its intended results. Rather there is a pattern of resource consumption over time (a "shape") by a service engine executed by at least one processor circuit in the computing system. The "service engine" is the application runtime environment implemented by at least one processor circuit storing application state variables and computation data in a tangible memory (e.g., DRAM). Hence, the application is executed based on the service engine satisfying the data-flow requirements of the application. This "shape" of an application (i.e., application shape), coupled with the power of a super-optimizing compiler can achieve a new kind of optimization; the optimization of the shape of a transaction's resource consumption in the time domain is referred to as "second-order optimization".

The utility of second-order optimization by the compiler circuit 38 can be best highlighted by its affect on utilization. For any given mix of executable applications 14, a second-order optimizer executed by the compiler circuit 38 can fit the executable applications 14 into a given set of resources more compactly than traditional techniques.

By way of analogy, if one imagines programs as pieces of a jigsaw puzzle, then a traditional service engine can be seen as placing the pieces side-by-side, without attempting to fit them together. The super-optimizer 38 is able to fit the pieces together whenever this is possible. A pareto optimizer is able to change the shape of each piece, enabling them to fit together when they might otherwise not.

I.F.6. Native Compilation

As described previously, the compiler circuit 38 can be configured for generating native code 22 for any platform, given the appropriate axioms 30 and metrics 40. The disclosed compiler circuit 38 has been demonstrated in experimental testing to compete favorably against expert human optimizations (i.e., manual optimizations), and to balance factors that are often overlooked (power efficiency, code size vs. execution speed, RF interference modeling, etc).

I.G. Catalog of Features for Injection

The following description identifies optional features that can be added (injected) into an executable system by the transformation system 12, based on adding the corresponding SML application 14.

I.G.1. Security and Compliance

Security validation is defined herein as identifying the existence of some desirable behavior, or absence of some undesirable behavior. Such behaviors can be specified using the SML language 16, along with associated axioms 30 and metrics 40. An important concept in proving the security of software is that checking a proof is easy and fast, although generating a proof may be difficult.

For the purposes of this section, we assume security of the underlying hardware, operating system (OS) and evaluator circuit 60.

The equality graph 56 and axioms 30 described previously are ideal for generating security proofs. The super-optimizer 38 can generate a proof by listing each axiom 30 instantiated in transforming an original program 14 into the final program variant 14'.

Since the behavior whose (existence/absence) proof to be identified is written in SML 16, this process of security validation can be considered another form of feature injection. If the compiler circuit 38 can successfully derive a program variant (i.e. successfully inject the feature), then the generated proof provides a mechanically verifiable guarantee that the software holds the behavior (its existence or absence).

This proof object can be efficiently checked, in real-time if necessary, before accepting a program for execution. Proof objects may also be transferred among distrustful parties, as they represent explicit truths about unknown program fragments.

Policy compliance often can be implemented simply as sets of metrics which track and cap certain operations (quotas). An example of policy compliance requiring new axioms is the insertion of logging, such as a medical records system that logs accesses to patient records. Another aspect of security arises based on adding new axioms 30 or 32 to the system.

A system of axioms is said to be consistent if no invalid statement can be derived using the system. Proof of consistency for a new axiom added to a system can be attained by requiring a client who submits a new axiom to provide proof of its consistency. Another technique is to attempt to produce a consistency proof, but charge the work against the user (or program) and abort if the effort exceeds some quota.

Once the axiom is proved consistent by the transformation system 14, the axiom may be applied to all programs 14, not just the program for which it was submitted. This behavior causes a multiplicative effect, as new axioms added for one program are applied by the transformation system 12 to other programs, improving the performance and resource consumption of the system as a whole.

This same strategy applies to modules, functions and other sub-components of programs. If two programs, submitted by independent parties, use equivalent sub-components, the super-optimizer 38 can be configured to select the better of the two implementations and use it for both programs. Here proof of equivalence is required, which is the series of axiom instantiations transforming the less efficient implementation into the better implementation.

Proofs also can be valuable for capturing domains with strict government certifications. The certification requirements can be encoded as axioms 30 or 32, and the program can be compiled by the compiler circuit 38 under these axioms. If the compilation is successful, the program is guaranteed to meet the certification.

I.G.2 Fault-Tolerance

Fault-Tolerance is the ability of a computing system to tolerate expected but unpredictable failures. Fault-tolerance is particularly beneficial for fault-prone computing nodes communicating across unreliable communication networks (e.g., Internet Protocol (IP) based networks such as a private wide area network or the World Wide Web). Therefore, providing guarantees against expected failures is desirable for many distributed applications.

As illustrated in FIG. 2, fault-tolerance can be injected into a program based on the transformation system 12 performing consensus on partial results of the program. The program (e.g., 14c) can be divided into independent sections (e.g., 14a, 14b, etc.), and multiple computing nodes in the network can perform computation of each section. As described previously, the SML language 16 is non-Turing complete, hence, the independent sections (e.g., 14a, 14b) cannot interfere with each other (for instance, they cannot have race conditions or deadlocks when executed concurrently). If a quorum of computing nodes agrees on the partial results for a given section (e.g., 14a), then computation may begin on the next section (e.g., 14b).

Any axioms 30, 32 configured for fault-tolerance can minor axioms 30 for distribution, as the distribution points can be exactly those points where fault-tolerance can be inserted. However, the metrics 40 for fault-tolerance differ—where distribution attempts to reduce the time to compute the result (by performing some tasks concurrently), a fault-tolerance algorithm attempts to reduce the cost of a failed consensus (which would require re-computing the section).

Example metrics 40 can model statistical summaries for ping times, a remote computing node's capacity to perform computations, reliability estimates for network links and computing nodes, and estimated downtimes when failures are detected. Super-optimization by the compiler circuit 38 can optimize the granularity of sections (e.g., 14a, 14b) to achieve the best balance between computation throughput and disruption due to failures.

I.G.3. Real-Time Guarantees

In one example embodiment, the transformation system 12 also can be implemented and applied in hardware-based real-time systems, given that the hardware, OS, and evaluator circuit 60 are valid for real-time processing.

The example metrics 40 for super-optimization are not limited to finding the "fastest" program as the optimal program variant 46; to the contrary, the example metrics 40 executed by the transformation system 12 can select among program variants 46 with stable, consistent processing times. These example metrics 40, referred to as "real-time metrics", can enable the selection of ideal variants for real-time scenarios.

The real-time metrics can be applied by the compiler circuit 38 to any program 14 written in SML 16, greatly expanding the available software for real-time applications, reducing the cost and time to market for projects with real-time constraints. The compiler circuit 38 also can identify any application 14 that cannot satisfy a constraint 32 or 34 that expresses a project's real-time deadline. Hence, the compiler circuit 38 can be used to eliminate a large class of potential failures. As with security proofs, the compiler circuit 38 can generate verifiable proofs that a program 14 always meets its deadlines.

I.G.4. Platform-Specific Hardware and Proprietary Extensions

Certain computing system deployment models can contain specialized hardware (ASICs, daughter cards, vector processors, etc). Prior applications have required significant rewrites and tuning to utilize the special hardware.

According to one example embodiment, the super-optimizer 38 can automate the process of rewriting an application 14. The evaluator circuit 60 can expose an application programming interface (API) to access the special hardware, and a set of axioms 30 and metrics can be added that define patterns of use. The super-optimizer 38 can replace sub-computations in the program 14 with calls to the platform-specific hardware API. A program variant 46 leveraging the specialized hardware is selected if some benefit is discovered from the corresponding cost variant 64.

As mentioned before, the super-optimizer 38 also can be configured for restructuring the architecture of the application 14 to increase opportunities to access the specialized hardware. More generally, the example embodiment can be used for any proprietary extensions available on some platform but not others (not just specialized hardware). Some examples of proprietary extensions can include: cryptography, where a program may require a cryptographic algorithm, which is only provided by a special node; Trade Secrets, where a company may choose to add some axioms only to the compiler in their products (e.g. improving performance, reducing energy costs)—in this example, benefits can be seen only when programs are executed in a system containing these nodes to promote product differentiation and brand loyalty.

Other examples of proprietary extensions can include Value-Added Services, where services such as logging, statistics, customer tracking, and advertisements can be provided through proprietary extensions. Applications executed in systems without these nodes would not gain the value-add features.

I.G.5. Network Management and Instrumentation

The example embodiments simplify system wide management and instrumentation, where features can be injected to track the desired data and store it into a stable data storage (e.g., 44). A separate, centrally managed, application can access this data generating the necessary reports or collating output into an exportable format.

Example management applications include: tracking network events, collecting statistics on compiler efficiency (improvements in speed, size, energy costs), and generating evidence for the return of investment of the IT infrastructure.

I.G.6. Disconnected Operation

Disconnected operation is the continued utility of a program during execution by one or more computing nodes during failures of a communications infrastructure interconnecting the computing nodes. In some sense, disconnected operation can be considered the opposite of distributed processing, as the program under execution by a computing node can make progress using only locally accessible resources.

Thus, if a computing node determines it is disconnected from the network, the computing node executing the transformation system can choose to perform actions locally even if those actions cost significantly more. When an operation requires interaction with an unreachable node, the computation can be persisted locally (cached, queued) until communication is re-established.

I.G.7. Decentralization

In one example embodiment, decentralization (Peer to Peer) is defined as the elimination of globally identifiable knowledge. Decentralized programs can operate without any notion of "centralized" or "global" control.

Many distributed applications that are designed to operate in a "decentralized" manner actually include global concepts within them, acting against their desired goal (a Globally Unique Identifier is a common example of this problem).

In one embodiment, decentralization can be realized in the SML 16 by the transformation system 12 enforcing lexical scopes for all identifiers, and eliminating globally accessible state, functions, and constants. Together with the restrictions discussed previously, every program 14 written according to the SML 16 operates only on local knowledge and is therefore formally "decentralized".

Programs 14 can be operated in decentralized fashion by providing metrics 40 for selection among multiple sources of a data value (e.g. load balancing, or rarest first). If a computing node has access to a data value from multiple sources, the computing node can choose the "best" source to retrieve the data value. Centralized deployments are a degenerate case where only one source is provided.

I.G.8. Persistence

Persistence is the stable storage of information across common failures by one or more computing nodes such as reboots, server maintenance, and power outages.

Programs written in the SML language 16 can interact with stable storage (e.g., 44) based on execution by a compiler circuit 38 having an evaluator circuit 60 with persistence features. As described previously, the evaluator circuit 60 can store partial computations in the storage 44 for later retrieval (e.g., a "pause" in computation).

For example, an evaluator circuit 60 can store a computation in order to free memory for another operation, or while waiting to synchronize concurrent operations.

Another common programming concept is to model entities that evolve independently from the rest of the system. Examples of such entities can be the tables and records stored in databases. These entities can be modeled in the SML language 16 using standard techniques (state monads and inductive data structures). When profitable these entities can be persisted to stable storage, emulating the function of relational databases.

Computational caching may also be used to improve performance, a standard technique called Memorization.

Experimental testing has validated the effectiveness of the example embodiments disclosed herein based on applying various axioms 30, and has proven the effectiveness of additional disclosed features, including parallelization (Section I.D.1), distributed processing (Section I.D.2), load balancing (Section I.G.7), persistence, and transformations such as map-fusion and program specialization (Section I.F.3).

II. Language Stack Having Segregated Language Primitives

Figure 9:
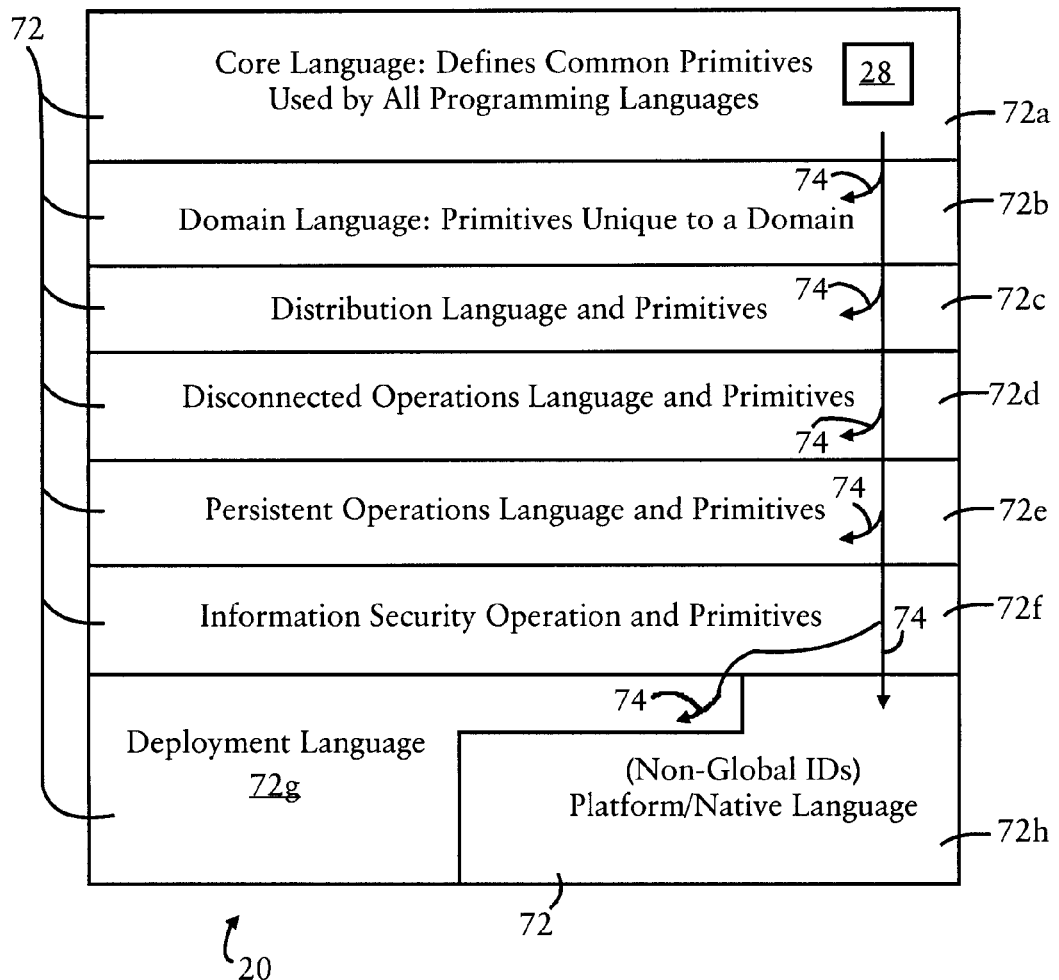
FIG. 9 illustrates implementation of the primitive type sets of FIG. 1 based on establishing segregation of language primitives, according to an example embodiment.

FIG. 9 illustrates an example implementation of the primitive type sets 20 of FIG. 1 based on establishing segregation of language primitives, according to an example embodiment.

As described previously, a primitive type 20 is a base type of input or output from which all other logical types are polymorphically derived. The prescribed symbol manipulation language 16 can be used to write applications 14 that do not rely on any primitives; to the contrary, the symbol manipulation language 16 is a purely functional language providing a logical specification describing the functions to be executed based on the manipulation of symbols, independent of any computing system deployment model. As described previously, the prescribed symbol manipulation language can provide a logical specification that describes functions, based on manipulation of symbols using types consisting only of tuple, sums and lambda types.

The compiler circuit 38 can determine whether a given symbol (or an expression containing multiple symbols) should be implemented as a particular primitive type during optimization of the SML application 14.

The optimization of the SML application 14 by the compiler circuit 38 requires that desired properties can be maintained for any application optimized for a given computing system deployment model, without introducing undesirable attributes such as instability, loss of security, or the loss of the ability to perform nondestructible transformations for different computing system deployment models. For example, one optimization can exploit the availability of a platform-specific hardware component (e.g., an application specific integrated circuit), although concerns can arise about the loss of the ability to perform nondestructible transformations from the transformed application optimized to use the proprietary features of the application-specific integrated circuit.

According to an example embodiment, the primitives 20 can be segregated into distinct languages 72 having respective sets of language primitives. Each of the languages 72, also referred to as "primitive layers", enables the establishment of a hierarchy of primitives 20 that ensures that an application 14 can be optimized into an optimized application 18 for a specific computing system deployment model having one or more specific attributes (e.g., application 18*a* of FIG. 1 optimized for System "A"), and/or optimized into an optimized application 18 that generically can work on any platform (e.g., 18*c*), while maintaining security and stability.

The languages (i.e., primitive layers) 72 can be segregated based on semantics and prescribed primitive requirements that define the "boundaries" of each of the languages 72. Each primitive layer (e.g., 72*a*, 72*b*, 72*c*, 72*d*, 72*e*, 72*f*, 72*e*, and 72*h*) has a corresponding set of semantics and prescribed primitive requirements relative to at least one computing system deployment model; hence, the corresponding set of semantics and prescribed primitive requirements define whether a primitive can be included within the corresponding primitive layer. Hence, if the compiler circuit 38 performs optimization for a particular computing system deployment model (e.g., disconnected operations), the compiler circuit 38 can perform the optimization using one or more associated primitive layers (e.g., 72a and 72d) that include language semantics and primitives for the corresponding computing system deployment model. The resulting optimized application utilizing a particular primitive layer, however, must be executed on a computing system having the corresponding computing system deployment model (with appropriate privileges).

Hence, by reasoned choice of primitives in each language 72, the desired properties can be maintained for any application written using the symbol manipulation language 16, while segregating primitives of other languages 72 to avoid undesirable effects.

FIG. 9 illustrates the segregation of primitives 20 into distinct example primitive layers 72, where dependent primitive layers (72b through 72h) can rely on language semantics and primitives inherited from a supporting core primitive layer 72a, without adverse effects from other primitive layers that are not relevant to optimization for a particular computing system deployment model. The core language (i.e., the core primitive layer) 72a includes the syntax and semantics 28 of the symbol manipulation language 16 (see FIG. 1). As described in further detail below, the core language 72a also includes a primitive layer requirement that the primitives within the primitive layer 72a (i.e., core language primitives) define common primitives used by all programs. Hence, any of the dependent primitive layers 72b through 72h can directly inherit and use any of the core language primitives within the primitive layer 72a. Inheritance is illustrated in FIG. 9 by the arrows 74, where the dependent primitive layers (e.g., 72b through 72h) can inherit and use the semantics 28 and core language primitives of the core primitive layer (e.g., 72a). The inheritance 74 illustrated in FIG. 9, however, is unidirectional only.

Each of the dependent primitive layers 72b through 72h are independent relative to each other. Hence, the compiler circuit 38 can utilize one or more primitive layers (e.g., 62d and 62f) for optimization of an application to be executed by a computing system deployment model having the associated attributes of the selected primitive layers. However the primitive layer 72h imposes a constraint 74 that requires non-global identifiers, hence any primitive from the primitive layer 72g that specifies a global identifier is rejected by the primitive layer 72h.

Hence, stability and security can be maintained by the compiler circuit 38 based on the compiler circuit 38 utilizing a one-way inheritance 74 to ensure that adverse effects are not introduced from primitives that are not required for optimization according to a particular computing system deployment model.

The core language (i.e., the core primitive layer) 72a is illustrated as 20c in FIG. 1, and includes the syntax and semantics 28 of the symbol manipulation language 16 that enables the SML application 14 to be executed generically (18c of FIG. 1) on any computing system deployment model. Hence, the core language 72a includes the syntax and semantics 28 and core language primitive requirements for a generic computing system deployment model having no hardware-specific or software-specific requirements.

The core language 72a also includes the primitive layer requirement, consistent with the syntax and semantics 28, that the core language 72a and associated core language primitives are declarative (purely functional), including integer and character constants, tuples, unions, functions, lists, and trees. Exemplary semantics 28 of the core language primitive layer 72a include terminal, identity, composition, pair-construction, projection, injection, case inspection, distribution, abstraction, application, inductive and coinductive data construction, and catamorphism (fold). Further, the primitive layer requirements for the core language primitives 72a specifically exclude general recursion and other turing-complete behavior, context-free identifiers (global identifiers), and platform-specific primitives (unique hardware APIs, native data types, etc, available only on a particular machine). Hence, the semantics 28 and prescribed primitive requirements of the core language 72a have a uniquely exclusionary relationship to any computing system deployment model (other than the generic computing system deployment model), in that the core language 72a is independent of any computing system deployment model having any hardware or software based requirements because the core language 72a requires purely functional primitives. Additional core language primitives can be added to the core language 72a as new discoveries are made in foundational mathematics, universal algebra and Category Theory.

It should be noted that any reference to "integer" within the description of the core language refers to a "type" that is defined in the prelude library 36 using purely symbols (illustrated in Section III below), and not a numerical integer such as a 32-bit integer.

The primitive layer requirements for the core language primitives 72 ensures that arbitrary third-party software written using the core language 72a is trustworthy, that the third-party software cannot corrupt data, cause system instability, etc.; in other words, the third-party software written using the core language 72a is "safe". Core language modules using the core language 72a may be composed and extended without restriction.

In general, application developers typically will write SML applications 14 using the core language 72a. In contrast, system developers for specific computing system deployment models in general will write programs using the relevant model-dependent languages 72b through 72h, while maintaining compliance with the requirements of the core language 72a.

The model-dependent languages 72b, 72c, 72d, 72e, 72f, 72g, and 72h include semantics and prescribed primitive requirements that are based on at least one or more software and/or hardware based requirement of a computing system deployment model. Hence, each successive model-dependent language (e.g., 72b through 72h) that is dependent on the core language 72a can provide successive restrictions and primitive requirements for more-specific computing system deployment models. In this regard, one computing system deployment model (e.g., distributed computing) can contain one or more specific computing system deployment models (e.g., peer-to-peer computing, client-server computing using distributed servers based on locality, etc.).

The domain language 72b includes primitives that are unique to a computing system deployment model for a corresponding domain: example domains can include vector mathematics, video processing, time or date functions, etc. These primitives in the primitive stack 72b can be combined using the core language 72a to form programs operating on domain data. As with the core language 72a, the semantics and prescribed primitive requirements for the domain language 72b require that a domain primitive must not introduce turing-complete behavior, global identifiers, nor platform-specific concepts.

The domain language 72b inherits the attributes of the core language 72a for an SML application 14 that is optimized by the compiler circuit 38 to include the domain language 72b; hence, the resulting SML application 14 optimized by the compiler circuit 38 based on the core language 72a and the domain language 72b is a domain module. Hence, if software modules using domain primitives are combined with core language modules, the resulting module also is a domain module. In this manner, domain primitives are "viral", enforcing domain constraints across all included software modules.

Multiple modules using different and distinct domain languages 72b also can be combined, if the domain constraints can be solved under the combined set of constraints. If domain constraints of respective distinct domain languages 72b cannot be solved under the combined set of constraints, the attempted composition is rejected and can be resolved using deployment primitives.

Domain modules implementing the domain language 72b also are "safe" with respect to execution of untrusted third-party software. In other words, generally only "safe" programs should be accepted from untrusted entities, and "unsafe" programs should be accepted only from trusted sources.

The languages 72c, 72d, 72e, and 72f, considered "unsafe" programs, are described below.

The deployment language 72g can be combined with the core primitive layer 72a and any one or more of the dependent primitive layers (e.g., 72a, 72b, 72c, 72d, 72e, and/or 72f), as appropriate, by the compiler circuit 38 into a complete executable application 18, also referred to herein as a deployment module. The non-global requirement is removed for deployment; hence, a deployment module can define and propagate global identifiers among modules. Since no global identifiers are used by other modules, implementations for all non-local functions of those modules must be provided by the deployment module (i.e.: libraries, prelude, etc). For example, this allows a dictionary module to be written in the domain language, then deployed using either a B*-Tree or a Hash Map as underlying data structure.

Deployment language modules are considered "unsafe", hence only trusted sources should be used for deployment scripts. Although deployment modules cannot cause a computing system to fail outright, deployment modules are considered "unsafe" because they could possibly cause denial of service through reduced capacity, leakage of private data, etc.

As described in Sections I.F.6 and I.G.4, the platform/native language 72h exposes native platform operations among inherited primitives such as core primitives, allowing platform-specific implementation of core or domain functions (for instance, to improve efficiency). The restriction against turing-complete and platform-specific operations is removed, however global identifiers are rejected. Hence, if an attempt is made to use the deployment language 72g in combination with the platform/native language 72h, the compiler circuit 38 will not apply to the platform/native language 72h any primitive from the deployment language 72g that employs a global identifier.

Platform language modules that are generated by the compiler circuit 38 employing the platform/native language 72h are considered "unsafe" and should only be sourced from trusted providers. Platform language modules could perform arbitrary actions, including malicious destruction of data, complete system failure, etc.

The languages 72c, 72d, 72e, and 72f illustrate additional properties that can be achieved by adding additional languages 72 to the stack of FIG. 9. Example requirements for the distribution language 72c are described, for example, in Section I.D.2, Section I.F. and Section V. Example requirements for the disconnected operations language 72d are described, for example, in Section I.G.6 and Section VI.

Example requirements for the persistent operations language 72e are described, for example, in Section I.G.8. Example requirements for the information security operations language 72f are described, for example, in Section I.G.1.

Hence, the stack of FIG. 9 includes calculus that enables the partitioning of programs for distributed execution (e.g., 72c) with persistent storage (e.g., 72e) under arbitrary disconnections of the communication fabric (e.g., 72d) and obeying information security policies (e.g., 72f), as well as core/domain/deploy/platform segmentation (72a, 72g, and 72h).

Hence, the compiler circuit 38 can provide a solution for secure, scalable, fault-tolerant distributed software by providing a stack of languages in which software is implemented. Segmentation of primitive operations among the languages guarantees the desirable properties. Applications written using core and domain languages 72a and 72b can be transformed easily using standard compiler techniques for optimization, native-code generation, bytecode interpretation, etc.

The restrictions imposed in each of the languages 72 ensure the desirable properties can be met, for example security, distributability, fault-tolerance, scalability. Security is met because insecure operations must either be platform-specific or turing-complete. Neither is allowed in the specification of a program, only in a final deployment (since deployment is a trusted operation, the deployment officer is left to select trusted primitive libraries). Distributability is met because all identifiers are local, thus any component which can be modified must be modified through a locally-scoped (and thus locally accessible) identifier. Patterns of access must pass between distributed nodes in a structurally-observable manner, amenable to compiler-transformations. Fault-tolerance is met because the declarative (pure functional) semantics allows arbitrary recomputation without regard for side-effects. Thus non-fatal failures and retries are invisible to the program.

Scalability is met because: declarative programs allow caching of oft-computed values; declarative programs are amenable to compiler transformations altering the control and dataflow of their algorithms to match the available parallelization of the platform; without global identifiers, the patterns of access for distributed data flow is exposed in the structure of the program, allowing further analysis of distributed control and dataflow over and above parallelization. Theoretical problems which are commonly intractable under general assumptions also become tractable when turing-complete behavior is eliminated (such as the equivalence of arbitrary functions, up to isomorphism).

III. Example SML Application: User Interface (Prelude)

Table 3 illustrates an example application 14, written according to the SML language 16, that describes an example user interface 36 of FIG. 1. As described previously, the transformation system 12 can be configured for transforming the application in Table 3 into an SML-based executable application that can be optimized for a prescribed computing system deployment model.

Table 3 illustrates declarations, including declarations of primitives (e.g., categorical primitives, primitive functions) following the "let" construct. For example, the categorical primitive "fst" returns the first item in a tuple, and the categorical primitive "snd" returns the second item in a tuple; the combinators primitive "const" returns a constant, the combinators primitive "id" is an identity function, etc. Table 3 also illustrates manipulation of tuples, sums, and lambdas using curry and uncurry operations according to lambda calculus. A curry operation can deconstruct a function having multiple inputs into an equivalent function that accepts only a single input, and as output the equivalent function returns another function that accepts only a single input, etc.

TABLE 3

Example Program Listing for User Interface (Prelude)

```
let
    -- Constants
    null                    = const Null;
    false                   = const False;
    true                    = const True;
    zero                    = const 0;
    -- Categorical Primitives
    bang                    = const Void;
    fst       a             = Fst a;
    snd       a             = Snd a;
    id        a             = a;
    const     k a           = k;
    cons      ab            = Cons ab;
    curry           f a b   = f (a, b);
    uncurry         f ab    = f (fst ab) (snd ab);
    catalist c f = (Cata (\v -> case v of Null -> c; Cons pr ->
f pr;));
    -- Primitive Functions
    eq        a b           = Equal (a,b);   --(a == b);
    neq       a b           = Not (eq a b);  --(a != b);
    lt        a b           = Lt (a,b);      --(a < b);
    gt        a b           = Gt (a,b);      --(a > b);
    lte       a b           = Lte (a,b);     --(a <= b);
    gte       a b           = Gte (a,b);     --(a >= b);
    and                     a::Bool b::Bool = And (a,b);   --(a && b);
    or                      a::Bool b::Bool = Or (a,b);    --(a || b);
    not                     a::Bool = Not a;               --(!a);
    plus                    a b = Plus (a,b);              --(a + b);
    minus a b = Minus (a,b);                               --(a − b);
    times a b = Times (a,b);                               --(a * b);
    divide a b = Divide (a,b);                             --(a / b);
    sqrt      a             = Sqrt a;
    -- Functions on Integers
    max a b                 = if (gt a b) then a else b;
    succ                    = plus 1;
    pred      a             = minus a 1;
    isNeg                   = gt  0;
    isPos                   = lte 0;
    -- Functions on Lists
    wrap      a             = [a];
    cat       a b           = catalist b cons a;
    length                  = catalist 0    (\pr -> plus 1 (snd pr));
    map     f               = catalist Null (\pr -> cons (f (fst pr), snd
pr));
    filter p ls = catalist Null (\pr -> if (p (fst pr)) then
(cons pr) else (snd pr)) ls;
    flatten                 = catalist Null (\pr -> cat (fst pr) (snd pr));
    isNull l                = eq 0 (length l);
    -- Combinators (from Gofer)
    cond      p fg a        = if (p a) then ((Fst fg) a) else ((Snd fg) a);
    meet            rs      = cond (fst rs) (snd rs, false);
    join            rs      = cond (fst rs) (true, snd rs);
    swap            pr      = (snd pr, fst pr);
    wok                     = r . swap;
    assocl a_bc = let
        a  = fst a_bc;
        bc = snd a_bc;
        b  = fst bc;
        c  = snd bc;
        in ((a,b),c));    -- (a,(b,c)) ==> ((a,b),c)
    assocr ab_c = let
        ab = fst ab_c;
        c  = snd ab_c;
        a  = fst ab;
        b  = snd ab;
        in (a,(b,c));     -- ((a,b),c) ==> (a,(b,c))
    dupl     a_bc = let
        a  = fst a_bc;
        bc = snd a_bc;
        b  = fst bc;
        c  = snd bc;
        in ((a,b),(a,c));  -- (a,(b,c)) ==> ((a,b),(a,c))
```

TABLE 3-continued

Example Program Listing for User Interface (Prelude)

```
    dupr     ab_c = let
        ab = fst ab_c;
        c  = snd ab_c;
        a  = fst ab;
        b  = snd ab;
        in ((a,c),(b,c));  -- ((a,b),c) ==> ((a,c),(b,c))
    -- Example Functions
    addOne i = catalist [ ]    (\pr -> cons (cons (i, fst pr), snd
pr));
    powerSet = catalist [[ ]]  (\pr -> cat (addOne (fst pr) (snd
pr)) (snd pr));
    -- Example List Data
    listNum  = [1,2,3,4];
    listStr  = ["a","b","c","d"];
in
```

IV. Example Hardware Overview

The transformation system 12 of FIG. 1 is implemented based on execution in hardware by any one or more of the computing nodes 70 of FIG. 7. Each computing node 70 is implemented as a physical machine (i.e., a hardware device) that includes a network interface circuit that can be configured for communications with another computing node 70 via a local link (e.g., local bus or local link), or a network connection based on implementing network communications with other physical machines via a physical communication network (e.g., an Internet Protocol over Ethernet network). Each computing node 70 also includes hardware logic circuitry (described below), and nontransitory and tangible computer readable media.

Hence, any of the disclosed circuits of the computing nodes (including the compiler circuit 38) 70 can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in a memory circuit of a computing node 70 causes the integrated circuit(s) implementing the processor circuit in the computing node 70 to store application state variables in processor memory, creating an executable application resource (e.g., an application instance) that performs the operations of the circuit as described herein. Hence, use of the term "circuit" in this specification refers to both a hardware-based circuit that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit can be implemented, for example, using one or more integrated circuits implemented in the form of a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit can be implemented dynamically by the processor circuit in the computing node 70, for example based on memory address assignment and partitioning executed by the internal processor circuit.

Further, the steps described herein (e.g., with respect any of the FIGS. 1-13) can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the steps described herein also can be implemented as executable logic that is encoded in one or more non-transitory tangible media for execution (e.g., programmable logic arrays or devices, field programmable gate arrays, programmable array logic, application specific integrated circuits, etc.).

V. Automatic Partitioning of Program for Distributed Execution

As described in Section I, use of the SML language 16 in writing the SML application 14 enables an executable application to be written in a manner that is completely independent of any attribute of any computing system deployment model, such that an application writer need not be concerned with the manner in which the SML application 14 is executed. In other words, the specification of the SML application 14 written according to the SML language 16 cannot express the technology used to implement the application 14; hence, platform specific operations such as message passing, threading, concurrency, coherence, fault tolerance or distribution are not permitted in the SML application 14 and are therefore of no concern to an application developer. Consequently, the requirements of the SML language 16 (e.g., a purely functional language, non-Turing complete, declarative, terminating, containing no global identifiers, and no platform-specific expressions etc.) restricts an application developer from adding any domain specific knowledge to the SML application 14.

According to an example embodiment, the transformation system 12 can be configured for optimizing a received SML application 14 for distributed execution by a distributed computing system 80 comprising two or more distributed computing devices 70, illustrated in FIG. 7. As described previously, the SML application 14 describes functions according to the prescribed symbol manipulation language 16 that is non-Turing complete and does not permit partial functions; hence, the symbol manipulation language 16 describes the functions of the received SML application 14 independent of any attribute of any computing system (e.g., independent of the distributed computing system 80.

Figure 10:
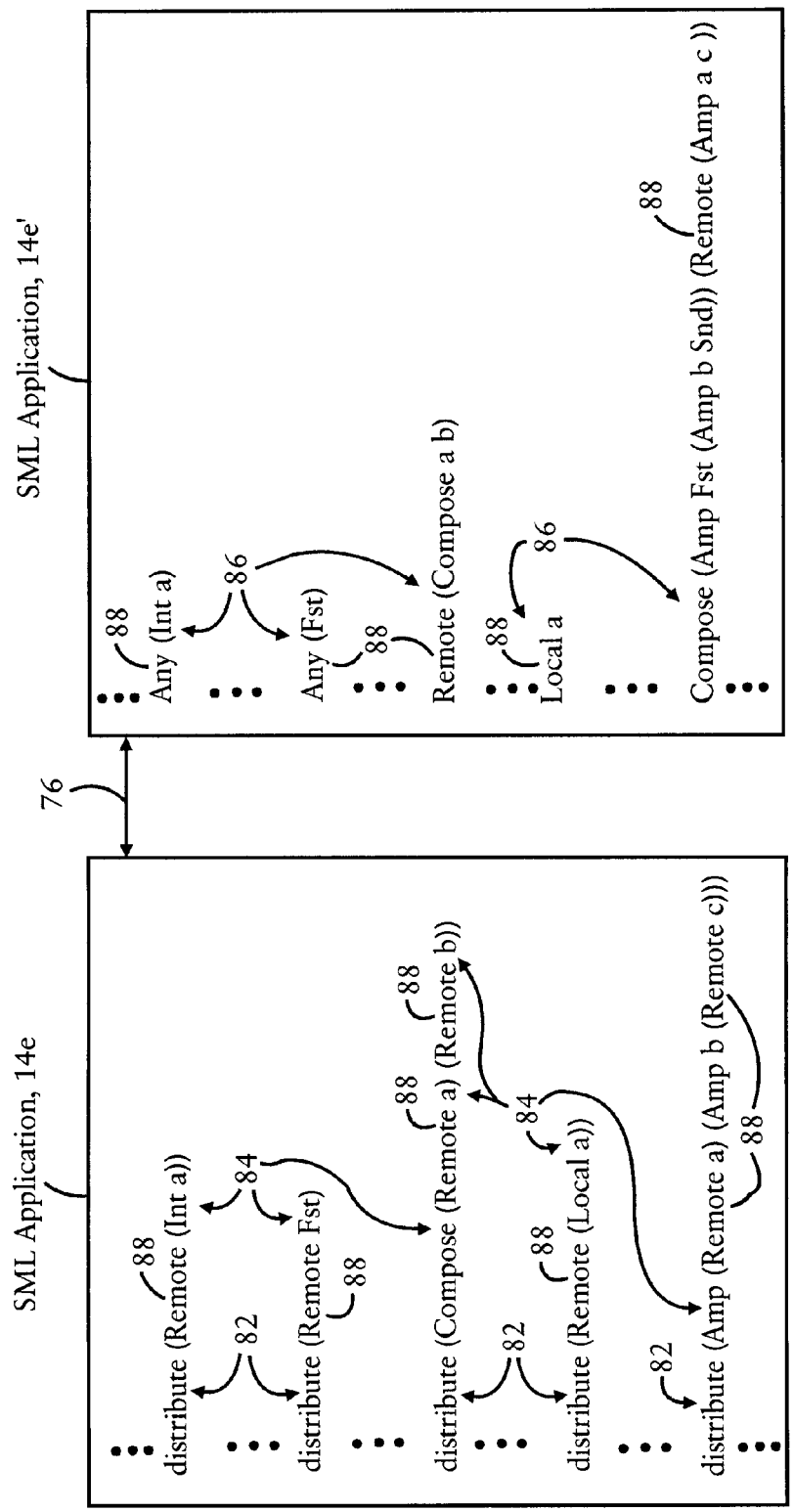
FIG. 10 illustrates an example SML application transformed by the compiler circuit of FIG. 1 as an optimization for execution by the distributed computing system of FIG. 7, according to an example embodiment.

FIG. 10 illustrates an example SML application 14*e* that is transformed by the compiler circuit 38 into a modified SML application 14*e'* as an optimization for execution by the distributed computing system 80 relative to prescribed metrics (e.g., prescribed optimization metrics 40 of FIG. 1), according to an example embodiment. The compiler circuit 38 is configured for executing the above-described non-destructive transformation of the SML application 14*e* using, for example, the optimization 76 of FIG. 3 including the steps 50, 51, 52, and 54, with additional operations described below with respect to FIG. 11.

According to an example embodiment, the compiler circuit 38 is configured for identifying, in the SML application 14*e*, a distribution annotation 88 that identifies a candidate element (e.g., "a", "b", "(Int a)", "Fst", etc.) 84 in the application, the candidate element 84 configured for execution in a distributed computing operation by the distributed computing system 70. Example distribution annotations 88 can include the primitives "Local", "Remote", and/or "Any". The "distribute" function 82 is the name of the function performing the transformation that optimizes the placement of the distribution annotations 88. The distribution annotations 88 enable the compiler circuit 38 to identify that the candidate element 84 can be optimized for a computing system deployment model describing a distributed computing system (e.g., 80 of FIG. 7), using for example equality axioms 30 and optimization metric programs 40 that can be part of the distribution language and primitives 72*c* of FIG. 9.

Hence, the distribution annotation 88 can be used by the compiler circuit 38 for selective optimization of candidate elements 84 according to an optimization domain for a computing system deployment model describing a distributed computing system.

The example distribution annotations 88 (e.g., "Local", "Remote", or "Any") can be used by the compiler circuit 38 to specify a target computing node 70 that should perform the specified operation. For example, the "local" distribution annotation 88 can be used to specify that the corresponding operation should be performed by a local computing device 70 executing the application 14; the "remote" distribution annotation 88 can be used to specify that the corresponding operation should be performed by a remote computing device 70 that is distinct from the local computing device 70 executing the application 14; the "any" distribution annotation 88 is an identity identifier that is logically equivalent to a "don't care" decision.

The compiler circuit 38 also is configured for generating one or more variants (e.g., 56 of FIGS. 4A-4D; 86 of FIG. 10) of distribution annotations 88 in the received SML application 14*e* based on executing a nondestructive transformation of the application 14 relative to prescribed equality axioms 40, at least one of the variants containing a corresponding semantically-equivalent variation of the candidate element. The compiler circuit 38 also is configured for selecting one of the variants as an optimization for execution of the application by the distributed computing system relative to prescribed optimization metrics.

Hence, the compiler circuit 38 can select one of the semantically-equivalent variants as an optimization for execution of the application by the distributed computing devices relative to prescribed optimization metrics.

Figure 11:
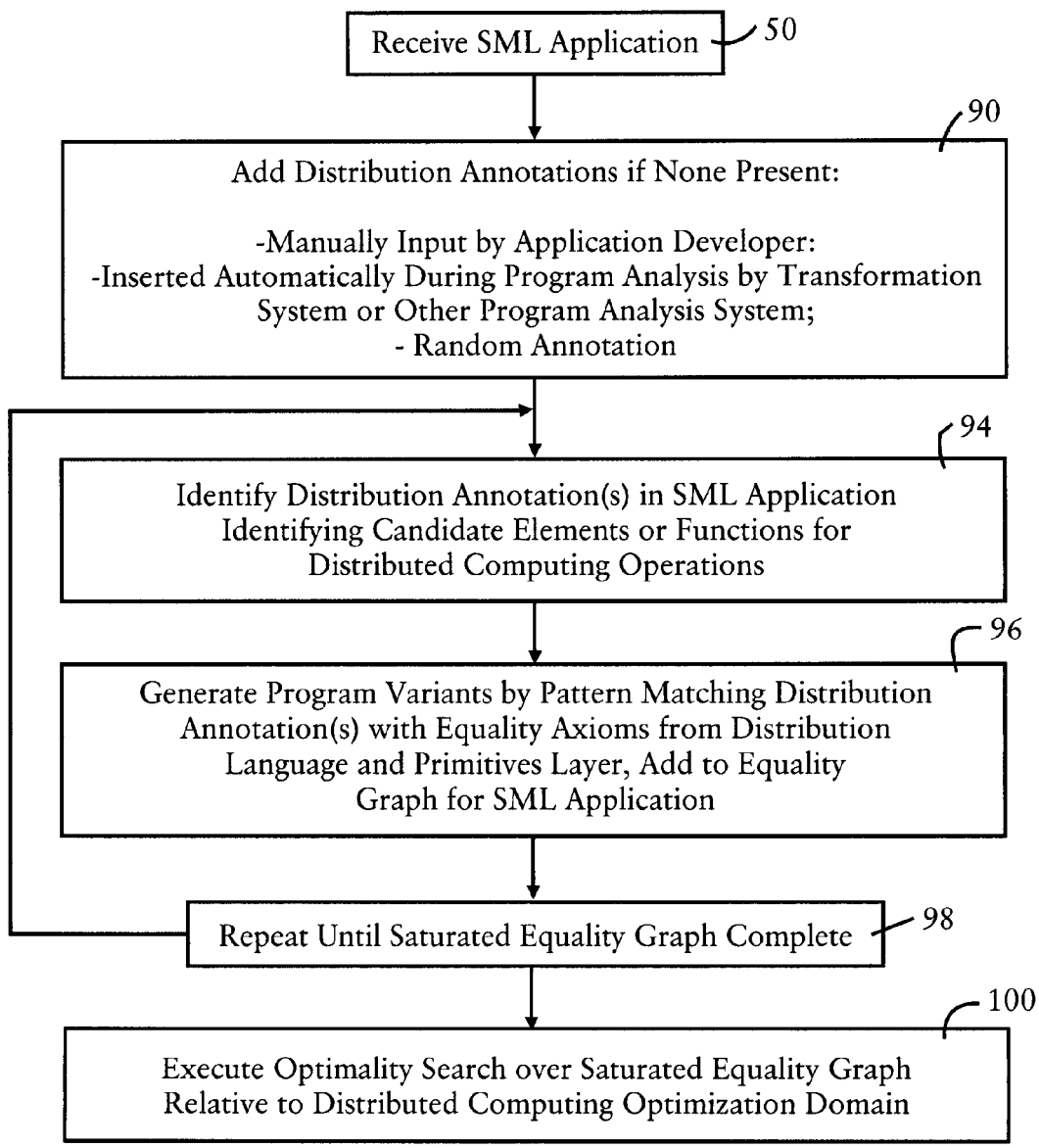
FIG. 11 illustrates an example method by the compiler circuit 38 of optimizing a received SML application 14 for execution by the distributed computing system 80 of FIG. 7, according to an example embodiment.

FIG. 11 illustrates an example method by the compiler circuit 38 of optimizing a received SML application 14 for execution by the distributed computing system 80 of FIG. 7, according to an example embodiment. In response to receiving the SML application 14*e* in step 50 of FIG. 11, the compiler circuit 38 can add distribution annotations 88 to the received SML application 14 in step 90 if none are present. For example, the compiler circuit 38 can be configured for sending a message to a user interface to enable manual input by an application developer: the compiler circuit 38 also can be configured for causing the distribution annotations 88 to be automatically inserted during program analysis by the transformation system 12, or another program analysis system; alternately, the compiler circuit 38 can be configured for randomly imitating the received SML application 14. Step 90 is not necessary, however, if he received SML application 14 is from a trusted source and already includes the distribution annotations 88. As noted previously, the distribution language 72c (containing the distribution annotations 88 in the form of Local, Remote, and Any primitives) is considered "unsafe", hence, an SML application 14 containing the distribution annotations 88 should not be accepted from untrusted sources.

Figure 12A:
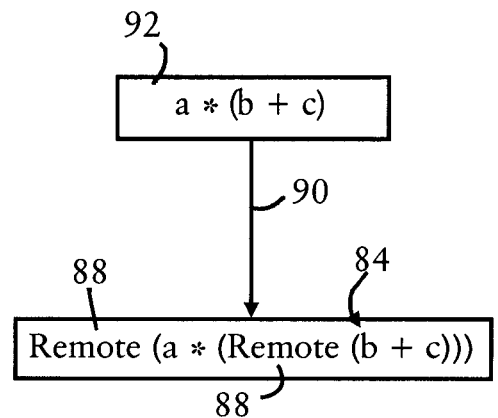
FIGS. 12A and 12B illustrate an example addition of distribution annotations to an application function of an SML application, according to an example embodiment.
Figure 12B:
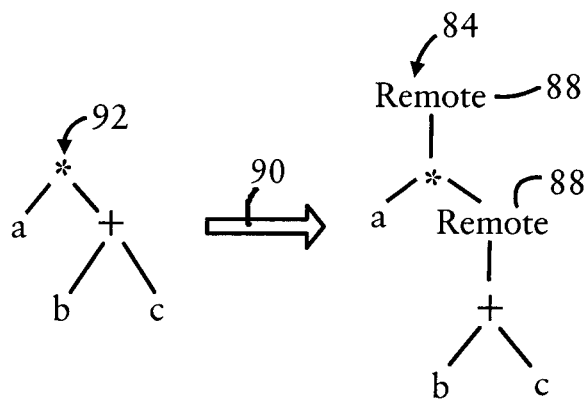

FIGS. 12A and 12B illustrate an example annotation of an expression 92 into a candidate element 84, according to an example embodiment. As described previously, the annotation 90 can be executed by the compiler circuit, by the transformation system 12, or by another program analysis system (not shown). FIG. 12A illustrates the expression 92 in the form of a logical expression of a symbol "a" that is multiplied (multiplication designated with the "*" character) with the arithmetic sum of the symbols "b" and "c", annotated in step 90 by the distribution annotation "Remote" 88, resulting in the expression "Remote (a*(Remote (b+c)))". FIG. 12B illustrates the expression 92 in the form of a program graph, similar to the description above with respect to FIGS. 4A-4D, converted into the program graph variant 84; hence, the program graph for the expression 92 is modified in step 90 based on adding the "remote" distribution annotations 88.

Referring to FIG. 11, the compiler circuit 38 is configured for identifying in step 94 the distribution annotations 88 in the received SML application (e.g., 14e) that identify the candidate elements 84 or functions for distributed computing operations. As illustrated in further detail below, a candidate element 84 can consist of a single distribution annotation 88 (e.g., a no-op), a distribution annotation 88 and a single symbol (e.g., a constant element), or can contain more symbols. The compiler circuit 38 is configured for generating in step 96 one or more program variants 86 based on executing a nondestructive transformation using equality axioms 30 that can be part of the distribution language and primitives 72c of FIG. 9. The compiler circuit 38 can repeat generating semantically-equivalent program variants in step 98 until a saturated equality graph (e.g., equivalent to 56d of FIG. 4D) has been completed. The compiler circuit 38 can execute in step 100 an optimality search over the saturated equality graph, as described above, relative to a distributed computing optimization domain in order to complete optimization of the application for execution by the distributed computing system 80.

Figure 13:
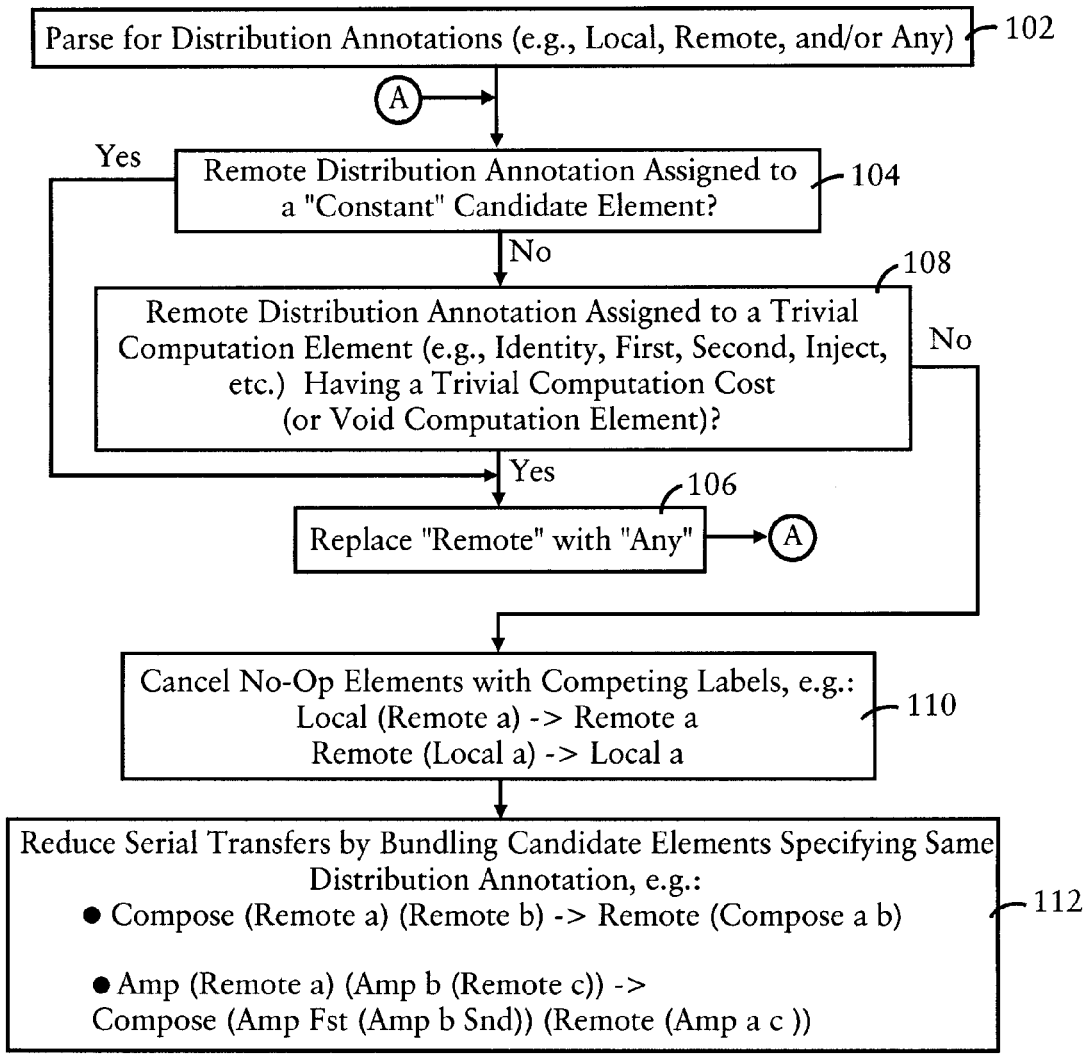
FIG. 13 illustrates an example implementation of transformation of distribution annotations relative to prescribed equality axioms associated with a computing system deployment model for a distributed computing system, according to an example embodiment.

Steps 94, 96, and 100 can be described in further detail with respect to Table 2 (described previously in Section I.D.2.) and the following Table 4 and FIG. 13. In addition to the Table 2 described previously, Table 4 illustrates additional example equality axioms 30 for generating program variants of a particular distributed computing operation in order to provide optimization for distributed computing. For example, the equality axioms in Table 4 optimize an application for distributed computing based on minimizing SML elements that need to be sent to a remote node, and/or bundling SML elements that are sent to a remote node to reduce the number of messages that need to be sent between computing nodes. As described previously, other annotations can be added, for example if more than two computing nodes are available, or if computing nodes are classified according to different computing platforms, etc.

TABLE 4

EXAMPLE AXIOMS FOR OPTIMIZING DISTRIBUTED COMPUTING

```
-- Constants
distribute (Remote (Int a))        = Any (Int a)
distribute (Remote (Str a))        = Any (Str a)
-- etc..
-- Trivial Computations
distribute (Remote Id)             = Any (Id)
distribute (Remote Void)           = Any (Void)
distribute (Remote Fst)            = Any (Fst)
distribute (Remote Snd)            = Any (Snd)
distribute (Remote InjL)           = Any (InjL)
distribute (Remote InjR)           = Any (InjR)
-- etc..
-- Combine annotations across joins.
distribute (Amp (Remote a) (Remote b))      = Remote (Amp a b)
distribute (Or (Remote a) (Remote b))       = Remote (Or a b)
distribute (Compose (Remote a) (Remote b))  = Remote (Compose a b)
-- etc.
-- No-Op Fragments vs. Non-Trivial Fragments
distribute (Remote (Remote a))     = Remote a
distribute (Any (Remote a))        = Remote a
distribute (Remote (Any a))        = Remote a
distribute (Local (Remote a))      = Remote a
distribute (Remote (Local a))      = Local a
-- Bundle Non-Trivial Fragments
distribute (Compose (Remote a) (Any b))     = Remote (Compose a b)
distribute (Compose (Any a) (Remote b))     = Remote (Compose a b)
distribute (Amp (Remote a) (Any b))         = Remote (Amp a b)
distribute (Amp (Any a) (Remote b))         = Remote (Amp a b)
distribute (Or (Remote a) (Any b))          = Remote (Or a b)
distribute (Or (Any a) (Remote b))          = Remote (Or a b)
-- Reduce number of round-trips
distribute (Amp (Remote a) (Amp (Remote b) c)) =
         Compose (Amp Fst (Amp Snd c)) (Remote (Amp a b))
distribute (Amp (Remote a) (Amp b (Remote c))) =
         Compose (Amp Fst (Amp b Snd)) (Remote (Amp a c))
-- Reduce message size
distribute (Remote (Amp a b)) | a == b = Compose (Amp Id Id)
(Remote a)
```

The expression "Amp" is equivalent to the "ampersand" symbol ("&"), and represents a logical primitive that constructs a tuple. Hence, a tuple consisting of a remote computation for symbol "a" and remote computation for "b" can be expressed as "Amp (Remote a)(Remote b)".

FIG. 13 illustrates an example implementation of transformation of distribution annotations relative to the equality axioms of Table 4 associated with a computing system deployment model for a distributed computing system, according to an example embodiment.

The compiler circuit 38 can implement step 94 of FIG. 11 by parsing in step 102 the received SML application 14 to identify distribution annotations 82 including distribution identifiers such as "Local", "Remote", or "Any". The compiler circuit 38 can implement the "Constants" equality axioms of Table 4 by determining in step 104 if a remote distribution annotation is assigned to a "Constant" candidate element: any remote distribution annotation (i.e., any distribution annotation 82 specifying a "Remote" distribution identifier 88) assigned to a constant candidate element is replaced by the compiler circuit 38 in step 106 with an "Any" distribution identifier 88. The compiler circuit 38 can implement the "Trivial Computations" equality axioms of Table 4 by determining in step 108 if there is any remote distribution annotation assigned to a trivial computation element that has a trivial computation cost, or assigned to a void computation element: any such remote distribution annotation assigned to a trivial computation element is replaced by the compiler circuit 38 in step 106 with an "Any" distribution identifier 88.

Hence, trivial computations (including symbols representing constants or void operations) are optimized to minimize unnecessary transfer of the trivial computations to a remote computing node, especially relative to the costs of transferring such trivial computations to the remote computing node (and receiving the trivial computation results from the remote computing node). Such trivial computations, however, can be bundled with any computations that require computation by a remote node due to minimal additional cost associated with including the trivial computations, described in further detail below with respect to step 112.

The compiler circuit 38 can implement the "No-Op Fragments vs. Non-Trivial Fragments" equality axioms of Table 4 based on deleting in step 110 FIG. 13 any No-op elements (e.g., consisting only of a distribution identifier 88 with no associated element) to eliminate conflicts and/or minimize unnecessary transfers between computing nodes 70. Hence, the expression "Remote (Local a)" can be transformed by the compiler circuit 38 into the variant "Local a", since the "Remote" distribution identifier 88 was a No-op element that do not provide any additional functionality to the expression.

The compiler circuit 38 can implement the remaining equality axioms "Bundle Non-Trivial Fragments", "Reduce number of round-trips" and/or "Reduce message size" by bundling the candidate elements 84 specifying the same distribution identifiers 88 within the distribution annotation 82, or rearranging symbols based on equivalent symbol identities. As illustrated in the equality axiom for reducing message size, since the symbol "a" is equal to the symbol "b", the expression "Remote (Amp a b)" can be replaced with the expression "Compose (Amp Id Id) (Remote a)", where "(Remote a)" remotely computes a value which is passed into "(Amp Id Id)" which creates a tuple containing two copies of the result. Since "a" and "b" are equivalent, only one of them needs to be computed and transferred.

Hence, the example embodiment can partition an annotated program into fragments such that feature interaction issues (such as deadlock) can be eliminated, network metrics (such as number or size of messages sent) can be reduced, and the requirement for specialized developer knowledge can be reduced or eliminated. Further, independently developed fragments may be combined and distributed without feature interaction errors.

VI. Automatic Partitioning of Program for Disconnected Operation

As described previously, distributed systems can involve deployment of two or more computing nodes that communicate between each other via unreliable network connections. Existing methods for development of distributed software (i.e., executable code configured for deployment in a distributed system) require significant planning on the part of developers to account for unique aspects of distributed software. Error cases that can occur in a distributed environment include partial system failures, slow or reduced connectivity in the network connections, lost/duplicated/reordered communications, and total loss of connectivity. Existing methods require that software modules configured for deployment in distributed systems encountering these conditions must be planned and designed for continued operation under each possible pattern of failure. Existing development techniques reduce the design burden by planning for only a few such error cases, and treating other cases conservatively (typically as total system failure). Software modules which have not been designed for distributed operation or whose designed set of error cases are over-conservative, cannot operate in an environment under duress.

In one embodiment, the compiler circuit 38 can provide automatic partitioning of a distributed software module, written as an SML application 14 using solely the symbol manipulation language, for arbitrary patterns of connectivity including complete disconnection, slow, reduced, flapping connectivity, and arbitrary partitioning of the connectivity graph.

The SML application 14 does not specify any explicit transmission or receipt of a value, nor does the SML application 14 specify any explicit name of a remote node, channel, queue, etc. As such, the SML application 14 is parallel and distribution-neutral, and can be optimized by the compiler circuit 38 into a transformed SML application 14' that is resilient to disconnected operation events, based on prescribed transformation rules.

In one embodiment, the compiler circuit 38 can operate on an SML application 14 comprising fragments having "resolved" distribution annotations. A "resolved" annotation can include sets of equivalent computing nodes (e.g., server computers) which may perform a computation and their known connectivity information (e.g., connectivity graph, shortest path, etc). The selection of fragments for annotation, and/or the process of "resolving" assignment of equivalent server computers to "Remote"-annotated fragments can be performed manually by an application developer or automatically by a program analysis.

Once an SML application 14 has resolved annotations, the example embodiment can optimize the application 14 based on partitioning the SML application for execution in arbitrary connectivity conditions by application of equality axioms associated with the Disconnected Operations Language and Primitives 72d of FIG. 9 (also referred to herein as "the Disconnected Calculus").

Example classes of transformation in the Disconnected Calculus of the Disconnected Operations Language and Primitives 72d include: trivial computations, remote-queued operations, that can be sent to multiple computing nodes, reordered, fused, etc.

Trivial computations can be redacted from remote-queued operations, reducing communication burden at the expense of local computation and memory (this transformation may be applied repeatedly to extract all possible locally-computable fragments, leaving remote-only operations on the queue).

Remote-queued operations can be assigned to nodes most likely to be available at the time of transmission. Remote-queued operations can be sent to multiple remote processing elements to achieve fault-tolerance at the expense of bandwidth. In cases of reduced bandwidth, remote-queued operations can be re-ordered, fused, or redacted to reduce communication burden and/or submit high-priority operations preferentially. Communications associated with remote-queued operations can be re-ordered for submission of high-priority operations. Operations can be fused to reduce message size and/or number of messages. Operations can be redacted (i.e., deleted) to reduce message size and/or number of messages.

In cases of complete communication failure, an example embodiment enables "disconnected operation" based on enabling maximization of local computation whenever possible, without additional design burden on software developers.

In cases of communication graph partitioning, an example embodiment enables maximal computation among connected sub-components, enabling optimized execution for distributed computing systems employing "ad-hoc mobility".

Hence, the example embodiment enables language-level techniques for automatic partitioning of SML-based applications to achieve continued operation in environments with failure patterns unaccounted for by software developers. The example embodiment utilizes a suite of transformations operating on modules of annotated fragments, producing a new set of modules which maximize the computable components for the computing system deployment model. The example embodiment reduces or eliminates the design burden for developers of distributed software modules.

The example embodiment also automatically transforms software modules for execution in arbitrary environments of communication failure, including failure cases unimagined or planned for by module developers. The example embodiment can be applied to arbitrary software modules, without requiring developers to use specialized libraries, specific object hierarchies, specific design methodologies (agents, message queues, etc), or operating-system or platform-specific extensions.

VII. Automatic Partitioning of Program for Security Policy Administration

Existing techniques for development of software with information-security requirements burdens practitioners with significant specialized knowledge in the security domain, including operating system internals, CPU cache behavior, shared or dynamic library internals, defensive programming, cryptography protocols and algorithms, attack vectors, etc. Interaction of features written by separate developers must be carefully orchestrated to avoid leaking or revealing private information.

Uniform application of information security policies for an enterprise may not be possible since information security decisions made by developers within an application may not conform to the policies of the enterprise. Further, applications which were not designed to provide information security cannot be used in a secure computing environment.

In one example embodiment, the compiler circuit 38 can provide for automatic partitioning of software for information security, based on equality axioms 30 and optimization metric programs 40 from the information security operation and primitives 72f of FIG. 9 (also referred to herein as Information Security Calculus). The example embodiment can reduce or eliminate the burden of specialized knowledge by developers, eliminate feature interaction issues, and enable uniform application of security policies. The example embodiment can be applied to software modules that were not designed to provide information security. The example embodiment also can verify security annotations to prevent information leaks.

The example embodiment requires that an application 14 written according to the SML language 16 cannot specify the explicit transmission or receipt of a value, nor the explicit name of a remote node, channel, queue, etc. The example embodiment further requires that the application 14 cannot specify any explicit persistence of a value to stable storage, placement or reception of data to locally-accessible hardware, etc. As such, the application 14 is information-security-neutral, and amenable to transformation techniques by the transformation system 12.

The compiler circuit utilizes the Information Security Calculus from the Information Security Operation and Primitives 72f to optimize a software module annotated with information security policies. As described previously, the annotation of selected fragments can be performed manually by an application developer or automatically by a program analysis module.

In one embodiment, example security annotations that can be optimized by the Information Security Calculus from the Information Security Operation and Primitives 72f can include: Public; Shared; Secret; Black Box; and Poison.

The compiler circuit 38 can determine from the Information Security Calculus that any computation or data annotated with the Public security annotation is free to be copied, transmitted, stored, composed or otherwise processed without restriction.

The compiler circuit 38 can determine from the Information Security Calculus that a Shared security annotation refers to any computation for which a restricted group of entities may access or process. Shared annotations include the group identifier. Session keys can be example implementations of shared computations.

The compiler circuit 38 can determine from the Information Security Calculus that a Secret security annotation marks computations which must be accessed only by locally-trusted entities (e.g., the local machine's CPU, or a physically-connected ASIC, etc). Passwords, private keys and associated computations (computation of password hash) can be example implementations of secret computations.

The compiler circuit 38 can determine from the Information Security Calculus that a Black Box security annotation identifies any data that cannot be re-computed locally but which is part of an information security protocol. An examples of Black Box data are a random number selected by another entity as part of a handshake, or another entity's public key. While this data is not explicitly dangerous, it is a vector for attack and must be handled appropriately. Each Black Box security annotation includes context-specific information regarding the computation.

The compiler circuit 38 can determine from the Information Security Calculus that a Poison security annotation marks all data which is entered as free-form, and thus a vector for chosen-plaintext attacks. Poison data must be passed through an antidote procedure before composition with any other computations. Each Poison security annotation includes context-specific information regarding the computation.

Table 5 illustrates example transformation rules (equality axioms) from the Information Security Calculus which enables the compiler circuit 38 to process information-security annotations over an SML application, allowing partitioning of the module to achieve uniform application of security policies.

TABLE 5

INFORMATION SECURITY EQUALITY AXIOMS

Public + Shared   = Shared
Public + Secret   = Secret
Public + Black Box = Black Box
Public + Poison   = Poison
Shared + Secret   = Secret
Black Box + Poison = Poison
Public + Public = Public
Secret + Secret = Secret
Shared(A,B) + Shared(A,C) = Shared(A)
Black Box(A) + Black Box(B) = Black Box(A,B)
Poison(A)   + Poison(B)   = Poison(A,B)
(All other compositions are rejected)
Security-Transforming Primitives:
Trusted-Antidote(A)[ Poison(A) ] = Black Box(A)
Trusted-Scramble[ Black Box(A) ] = Shared(A)
Trusted-Compose [ Secret, Shared(A,B) ] = Shared(A,B)
Trusted-Constructor[ * ] = Secret
Trusted-PKI[ Secret ] = Public Hence, the example embodiment provides for arbitrary security policies (such as rejecting MD5 as a Trusted-Scramble, or requiring all Trusted-Constructors to be 256 bits). These policies are applied uniformly over all software modules during the partitioning process. The example embodiment provides a language-level solution to achieve information security of arbitrary software modules. The example embodiment requires software modules to be developed in an information-security neutral language and annotated by a security policy engine. Once annotated the compiler circuit 38 can verify the security of the annotations, apply transformations which allow partitioning of the software module for execution, and uniform application of security policies.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method executable by a machine, the method comprising:
receiving an application that describes functions according to a prescribed symbol manipulation language, the prescribed symbol manipulation language a non-Turing complete language that does not permit partial functions and describes the functions independent of any attribute of any computing system;
identifying, in the application, a distribution annotation that identifies a candidate element in the application, the candidate element configured for execution in a distributed computing operation by a distributed computing system comprising two or more distributed computing devices;
generating one or more variants of the application based on executing a nondestructive transformation of the application relative to prescribed equality axioms, at least one of the variants containing a corresponding semantically-equivalent variation of the candidate element; and
selecting one of the variants as an optimization for execution of the application by the distributed computing system relative to prescribed metrics;
wherein the application includes a plurality of distribution annotations, each distribution annotation specifies that the corresponding candidate element is destined for execution by a local one of the distributed computing devices, a remote one of the distributed computing devices, or any of the distributed computing devices;
wherein the generating further includes selectively combining candidate elements in the application specifying the same corresponding distribution annotation into a single operation to be executed by the corresponding destined distributed computing device.

2. The method of claim 1, wherein the generating includes selectively replacing a first of the distribution annotations, specifying execution by one of the local, remote, or any distributed computing devices, with a second of the distribution annotations specifying execution by a distinct other one of the local, remote, or any distributed computing devices, based on the prescribed metrics.

3. The method of claim 1, wherein the generating further includes selectively modifying first distribution annotations, specifying execution by one of the local or remote distribution, with a second of the distribution annotations specifying execution by any distributed computing device, based on the prescribed metrics identifying a trivial computation cost according to the first distribution annotations.

4. The method of claim 1, wherein the generating further includes bundling the candidate elements specifying the same corresponding distribution annotation into a single expression for execution by the corresponding destined distributed computing device, for minimizing transfers between the distributed computing devices during execution of the application.

5. The method of claim 1, wherein the generating further includes deleting a no-op element having a corresponding distribution annotation that competes with the distribution annotation of a second candidate elements associated with the no-op element and having a nontrivial computation cost.

6. The method of claim 1, wherein the generating includes selectively bundling the candidate elements specifying the same corresponding distribution annotation for the remote one of the distributed computing devices, for minimizing transfers between the distributed computing devices during execution of the application.

7. The method of claim 1, wherein the application consists of describing the functions only according to the prescribed symbol manipulation language, the prescribed symbol manipulation language capable of describing the functions using types consisting of tuple, sums, and lambda types.

8. An apparatus comprising:
a non-transitory tangible computer readable storage medium configured for storing an executable application that describes functions according to a prescribed symbol manipulation language, the prescribed symbol manipulation language a non-Turing complete language that does not permit partial functions and describes the functions independent of any attribute of any computing system; and
a compiler circuit configured for generating an optimization of the application for execution by a distributed computing system comprising two or more distributed computing devices, the compiler circuit configured for identifying, in the application, a distribution annotation that identifies a candidate element in the application, the candidate element configured for execution in a distributed computing operation by the distributed computing system, the compiler circuit configured for generating one or more variants of the application based on executing a nondestructive transformation of the application relative to prescribed equality axioms, at least one of the variants containing a corresponding semantically-equivalent variation of the candidate element, the compiler circuit configured for selecting one of the variants as an optimization for execution of the application by the distributed computing system relative to prescribed metrics;
wherein the application includes a plurality of distribution annotations, each distribution annotation specifies that the corresponding candidate element is destined for execution by a local one of the distributed computing devices, a remote one of the distributed computing devices, or any of the distributed computing devices;
wherein the compiler circuit is configured for selectively combining candidate elements in the application specifying the same corresponding distribution annotation into a single operation to be executed by the corresponding destined distributed computing device.

9. The apparatus of claim 8, wherein the compiler circuit is configured for selectively replacing a first of the distribution annotations, specifying execution by one of the local, remote, or any distributed computing devices, with a second of the distribution annotations specifying execution by a distinct other one of the local, remote, or any distributed computing devices, based on the prescribed metrics.

10. The apparatus of claim 8, wherein the compiler circuit is configured for selectively modifying first distribution annotations, specifying execution by one of the local or remote distribution, with a second of the distribution annotations specifying execution by any distributed computing device, based on the prescribed metrics identifying a trivial computation cost according to the first distribution annotations.

11. The apparatus of claim 8, wherein the compiler circuit is configured for bundling the candidate elements specifying the same corresponding distribution annotation into a single expression for execution by the corresponding destined distributed computing device, for minimizing transfers between the distributed computing devices during execution of the application.

12. The apparatus of claim 8, wherein the compiler circuit is configured for deleting a no-op element having a corresponding distribution annotation that competes with the distribution annotation of a second candidate elements associated with the no-op element and having a nontrivial computation cost.

13. The apparatus of claim 8, wherein the compiler circuit is configured for selectively bundling the candidate elements specifying the same corresponding distribution annotation for the remote one of the distributed computing devices, for minimizing transfers between the distributed computing devices during execution of the application.

14. The apparatus of claim 8, wherein the application consists of describing the functions only according to the prescribed symbol manipulation language, the prescribed symbol manipulation language capable of describing the functions using types consisting of tuple, sums, and lambda types.

15. Logic encoded in one or more non-transitory tangible media for execution and when executed operable for:

receiving an application that describes functions according to a prescribed symbol manipulation language, the prescribed symbol manipulation language a non-Turing complete language that does not permit partial functions and describes the functions independent of any attribute of any computing system;

identifying, in the application, a distribution annotation that identifies a candidate element in the application, the candidate element configured for execution in a distributed computing operation by a distributed computing system comprising two or more distributed computing devices;

generating one or more variants of the application based on executing a nondestructive transformation of the application relative to prescribed equality axioms, at least one of the variants containing a corresponding semantically-equivalent variation of the candidate element; and selecting one of the variants as an optimization for execution of the application by the distributed computing system relative to prescribed metrics;

wherein the application includes a plurality of distribution annotations, each distribution annotation specifies that the corresponding candidate element is destined for execution by a local one of the distributed computing devices, a remote one of the distributed computing devices, or any of the distributed computing devices;

wherein the generating further includes selectively combining candidate elements in the application specifying the same corresponding distribution annotation into a single operation to be executed by the corresponding destined distributed computing device.

* * * * *